United States Patent
Yang et al.

(10) Patent No.: US 12,129,205 B2
(45) Date of Patent: Oct. 29, 2024

(54) FIBER-REINFORCED BRITTLE MATRIX COMPOSITE

(71) Applicant: ceEntek Pte Ltd., Singapore (SG)

(72) Inventors: En-Hua Yang, Singapore (SG); Shan He, Singapore (SG)

(73) Assignee: ceEntek Pte. Ltd., Singapore (SG)

( * ) Notice: Subject to any disclaimer, the term of this patent is extended or adjusted under 35 U.S.C. 154(b) by 432 days.

(21) Appl. No.: 16/603,561

(22) PCT Filed: Apr. 9, 2018

(86) PCT No.: PCT/SG2018/050178
§ 371 (c)(1),
(2) Date: Oct. 7, 2019

(87) PCT Pub. No.: WO2018/186808
PCT Pub. Date: Oct. 11, 2018

(65) Prior Publication Data
US 2021/0087110 A1    Mar. 25, 2021

(30) Foreign Application Priority Data
Apr. 7, 2017  (SG) ............................ 10201702896V

(51) Int. Cl.
*C04B 20/10* (2006.01)
*C04B 16/06* (2006.01)
(Continued)

(52) U.S. Cl.
CPC ...... *C04B 20/1055* (2013.01); *C04B 16/0625* (2013.01); *C04B 16/0683* (2013.01);
(Continued)

(58) Field of Classification Search
None
See application file for complete search history.

(56) References Cited

U.S. PATENT DOCUMENTS

| | | | |
|---|---|---|---|
| 2009/0288820 A1* | 11/2009 | Barron | C09K 8/805 |
| | | | 166/250.1 |
| 2011/0160104 A1* | 6/2011 | Wu | C04B 35/645 |
| | | | 507/269 |

(Continued)

FOREIGN PATENT DOCUMENTS

| | | |
|---|---|---|
| CN | 101274831 A | 10/2008 |
| CN | 103951455 A | 7/2014 |

(Continued)

OTHER PUBLICATIONS

Al-Rub et al., "Mechanical Properties of Nanocomposite Cement Incorporating Surface-Treated and Untreated Carbon Nanotubes and Carbon Nanofibers," *J. Nanomech. Micromech.* 2(1):1-6, 2012.

(Continued)

*Primary Examiner* — John J Figueroa
(74) *Attorney, Agent, or Firm* — COOLEY LLP

(57) ABSTRACT

There is provided a fiber-reinforced brittle matrix composite. The fiber-reinforced brittle matrix composite comprises a brittle matrix material (for example, a cementitious or ceramics material) and a coated fiber embedded in the brittle matrix material, wherein the coated fiber comprises a fiber (for example, polyethylene fiber, glass fiber, silicon carbide fiber, alumina fiber, mullite fiber) and a coating material (for example, carbon nanofibers, carbon nanotubes), which is non-covalently disposed on the fiber. A method for producing the fiber-reinforced brittle matrix composite is also provided. The method comprises providing a fiber, disposing a coating material on the fiber to form a coated fiber, wherein the coating material is non-covalently disposed on the fiber, and embedding the coated fiber in a brittle matrix material to obtain the fiber-reinforced brittle matrix composite.

18 Claims, 15 Drawing Sheets

(51) Int. Cl.

| | |
|---|---|
| C04B 20/00 | (2006.01) |
| C04B 28/04 | (2006.01) |
| C04B 35/01 | (2006.01) |
| C04B 35/56 | (2006.01) |
| C04B 35/58 | (2006.01) |
| C04B 35/80 | (2006.01) |
| C04B 103/30 | (2006.01) |

(52) U.S. Cl.
CPC .......... *C04B 20/0068* (2013.01); *C04B 28/04* (2013.01); *C04B 35/01* (2013.01); *C04B 35/56* (2013.01); *C04B 35/58* (2013.01); *C04B 35/5805* (2013.01); *C04B 35/80* (2013.01); *C04B 2103/30* (2013.01); *C04B 2201/52* (2013.01)

(56) References Cited

U.S. PATENT DOCUMENTS

| | | | | |
|---|---|---|---|---|
| 2012/0277130 | A1* | 11/2012 | Usova | C04B 35/62695 |
| | | | | 507/269 |
| 2015/0175750 | A1* | 6/2015 | Hopkins | C08K 3/14 |
| | | | | 524/588 |
| 2016/0046529 | A1* | 2/2016 | Bricco | E21B 10/46 |
| | | | | 175/425 |
| 2016/0075601 | A1* | 3/2016 | Youngblood | C04B 40/0067 |
| | | | | 106/805 |
| 2017/0029329 | A1 | 2/2017 | Williamson | |
| 2018/0022980 | A1* | 1/2018 | Leidinger | C04B 28/02 |
| | | | | 166/292 |

FOREIGN PATENT DOCUMENTS

| | | |
|---|---|---|
| CN | 104446264 A | 3/2015 |
| DE | 10 2005 048 190 A1 | 4/2007 |

OTHER PUBLICATIONS

Aveston et al., "Theory of multiple fracture of fibrous composites," *Journal of Materials Science* 8:352-362, 1973.
Batoz et al., "UHPFRC Development: Experience with Ductal® Over the Past Two Decades," *Designing and Building with UHPFRC*:43-62, 2009.
Cao et al., "Highly Bendable, Transparent Thin-Film Transistors That Use Carbon-Nanotube- Based Conductors and Semiconductors with Elastomeric Dielectrics," *Adv. Mater.* 18:304-309, 2006.
Chen et al., "Ultra high performance cement-based composites incorporating low dosage of plasma synthesized carbon nanotubes," *Materials and Design* 108:479-487, 2016.
Choi et al., "Ultra-high-ductile behavior of a polyethylene fiber-reinforced alkali-activated slag-based composite," *Cement and Concrete Composites* 70:153-158, 2016.
Ghaharpour et al., "Parametric investigation of CNT deposition on cement by CVD process," *Construction and Building Materials* 113:523-535, 2016.
Horn et al., "Direct Measurement of Forces Due to Solvent Structure," *Chemical Physics Letters* 71(2):192-194, 1980.
Kaempgen et al., "Transparent carbon nanotube coatings," *Applied Surface Science* 252:425-429, 2005.
Kamal et al., "Evaluation of crack opening performance of a repair material with strain hardening behavior," *Cement & Concrete Composites* 30:863-871, 2008.
Konsta-Gdoutos et al., "Multi-scale mechanical and fracture characteristics and early-age strain capacity of high performance carbon nanotube/cement nanocomposites," *Cement & Concrete Composites* 32:110-115, 2010.
Lawrence et al., "Structural transformation of vapor grown carbon nanofibers studied by HRTEM," *J Nanopart Res* 10:1155-1167, 2008.

Lei et al., "Heterocoagulation System Assisted Adsorption of Carbon Nanotubes on Alumina for Toughening Ceramics," *Journal of Reinforced Plastics and Composites* 27(3):245-253, 2008.
Liew et al., "Carbon nanotube reinforced cementitious composites: An overview," *Composites: Part A* 91:301-323, 2016.
Lin et al., "Crack Bridging in Fiber Reinforced Cementitious Composites with Slip-Hardening Interfaces," *J. Mech. Phys. Solids* 45(5):763-787, 1997.
Lu et al., "A new model for the cracking process and tensile ductility of Strain Hardening Cementitious Composites (SHCC)," *Cement and Concrete Research* 79:353-365, 2016.
Lum et al., "Hydrophobicity at Small and Large Length Scales," *J. Phys. Chem. B* 103:4570-4577, 1999.
Marshall et al., "A J-Integral Method for Calculating Steady-State Matrix Cracking Stresses in Composites," *Mechanics of Materials* 7:127-133, 1988.
McKinsey & Company, "Infrastructure productivity: How to save $1 trillion a year," 1-88, 2013 (100 pages).
Metaxa et al., "Carbon nanofiber cementitious composites: Effect of debulking procedure on dispersion and reinforcing efficiency," *Cement & Concrete Composites* 36:25-32, 2013.
Meyer et al., "Recent progress in understanding hydrophobic interactions," *PNAS* 103(43):15739-15746, 2006.
Nasibulin et al., "A novel approach to composite preparation by direct synthesis of carbon nanomaterial on matrix or filler particles," *Acta Materialia* 61:1862-1871, 2013 (11 pages).
Nochaiya et al., "Behavior of multi-walled carbon nanotubes on the porosity and microstructure of cement-based materials," *Applied Surface Science* 257:1941-1945, 2011.
Qian et al., "Hierarchical Composites Reinforced with Carbon Nanotube Grafted Fibers: The Potential Assessed at the Single Fiber Level," *Chem. Mater.* 20:1862-1869, 2008.
Qiu et al., "A micromechanics-based fatigue dependent fiber-bridging constitutive model," *Cement and Concrete Research* 90:117-126, 2016.
Rahy et al., "Coating of carbon nanotubes on flexible substrate and its adhesion study," *Applied Surface Science* 255:7084-7089, 2009.
Ranade et al., "Composite Properties of High-Strength, High-Ductility Concrete," *ACI Materials Journal* 110:413-422, 2013.
Ranade et al., "Micromechanics of High-Strength, High-Ductility Concrete," *ACI Materials Journal* 110:375-384, 2013 (14 pages).
Redon et al., "Measuring and Modifying Interface Properties of PVA Fibers in ECC Matrix," *Journal of Materials in Civil Engineering* 13:399-406, 2001.
Sakulich et al., "Nanoscale characterization of engineered cementitious composites (ECC)," *Cement and Concrete Research* 41:169-175, 2011.
Shi et al., "A review on ultra high performance concrete: Part I. Raw materials and mixture design," *Construction and Building Materials* 101:741-751, 2015.
Singh et al., "Drying transition of confined water," *Nature* 442:526, 2006 (1 page).
Sobolkina et al., "Effect of Carbon-Based Materials on the Early Hydration of Tricalcium Silicate," *J. Am. Ceram. Soc.* 99(6):2181-2196, 2016.
Sun et al., "In situ growth of carbon nanotubes/carbon nanofibers on cement/mineral admixture particles: A review," *Construction and Building Materials* 49:835-840, 2013.
Thostenson et al., "Carbon nanotube/carbon fiber hybrid multiscale composites," *Journal of Applied Physics* 91(9):6034-6037, 2002. (5 pages).
Ulm et al., "Concrete innovation potential: from atoms to green infrastructure," *Beton—und Stahlbetonbau* 107 (8): 504-509, 2012 (8 pages) (with English Abstract).
Van Vliet et al., "Set in stone? A perspective on the concrete sustainability challenge," *MRS Bulletin* 37:395-402, 2012 (11 pages).
Veedu et al., "Multifunctional composites using reinforced laminae with carbon-nanotube forests," *nature materials* 5:457-462, 2006.
Wang et al., "A review on ultra high performance concrete: Part II. Hydration, microstructure and properties," *Construction and Building Materials* 96:368-377, 2015.
Wu et al., "Fiber/cement interface tailoring with plasma treatment," *Cement & Concrete Composites* 21:205-212, 1999.

(56) References Cited

OTHER PUBLICATIONS

Yang et al., "Fiber-Bridging Constitutive Law of Engineered Cementitious Composites," *Journal of Advanced Concrete Technology* 6(1):181-193, 2008.
Yang et al., "Strain-hardening fiber cement optimization and component tailoring by means of a micromechanical model," *Construction and Building Materials* 24:130-139, 2010.
Zheng et al., "Surface Modification of Ultrahigh-Molecular-Weight Polyethylene Fibers," *Journal of Polymer Science: Part B: Polymer Physics* 42:463-472, 2004.
Cohen et al., "Effect of nanofillers and production methods to control the interfacial characteristics of glass bundles in textile fabric cement-based composites," *Composites: Part A* 43:962-972, 2012.
International Search Report and Written Opinion for Application No. PCT/SG2018/050178, dated Jul. 5, 2018, 11 pages.
Extended European Search Report for Application No. EP18781761.4, dated Nov. 25, 2020, 8 pages.
Examination Report dated Jul. 11, 2023 for European Application No. 18781761.4, 9 pages.

* cited by examiner

Individual single fiber pullout specimen

FIBER-REINFORCED BRITTLE MATRIX COMPOSITE

CROSS-REFERENCE TO RELATED APPLICATION

This application is a U.S. National Stage Application under 35 U.S.C. § 371 of International Application No. PCT/SG2018/050178, filed Apr. 9, 2018, which claims the benefit of priority of Singapore patent application No. 10201702896V filed on 7 Apr. 2017, the contents of which are hereby incorporated herein by reference in their entirety for all purposes.

TECHNICAL FIELD

Various embodiments relate to a fiber-reinforced brittle matrix composite and a method for preparing the fiber-reinforced brittle matrix composite. The fiber-reinforced brittle matrix composite may be applied as a construction and building material, particularly for use in primary load bearing structure.

BACKGROUND

High-strength high-modulus materials such as ceramics and cementitious materials, which are examples of brittle matrix material, have been used as viable primary load-bearing structures. However, poor structural reliability resulting from their brittleness is the principal drawback. For example, ultra-high performance concrete (UHPC) represents a group of cement-based materials that achieves compressive strength exceeding 150 MPa. The ultra-high strength of UHPC can effectively reduce the size of structural members and thus lower the concrete usage, mitigating the environmental impact and also result in greater flexibility in architectural design. Nevertheless, UHPC is often associated with increased brittleness and reduced crack resistance. Short fibers have been used as reinforcement to mitigate brittle failure of concrete, to control the crack propagation, and even to impart ductility to cement-based materials. For example, strain hardening cementitious composites (SHCC) with tensile strain capacity exceeding 2% have been developed through tailoring of fiber-bridging under the guidance of micromechanics.

Even though surface treatment of fibers by plasma can enhance the interfacial bond between fiber and cement-based matrix, the high energy and temperature of plasma beam may cause fiber damage and result in reduction of fiber strength. On the other hand, cold plasma treatment of fibers may only slightly reduce crack width and non-uniform plasma coating tends to degrade the mechanical performance of SHCC.

Although in-situ growth of carbon nanotubes/carbon nanofibers (CNT/CNF) on the surface of cement, sand, or fibers or grafting of CNTs on the fiber surface provide a feasible approach to introduce concentrated CNT/CNF in the interface transition zone (ITZ), such grafting technique requires a high temperature synthesis process of 500-1000° C., which cannot be applied to most polymeric fibers with low melting temperature. It is necessary to develop improved methods that are applicable to a much wider range of fibers, and composites arising from these.

Hence, there remains a need to develop improved fiber-reinforced brittle matrix composites and methods to produce them that address or at least alleviate one or more of the above-mentioned problems.

SUMMARY

In a first aspect, there is provided a fiber-reinforced brittle matrix composite. The fiber-reinforced brittle matrix composite comprises a brittle matrix material and a coated fiber embedded in the brittle matrix material, wherein the coated fiber comprises a fiber and a coating material which is non-covalently disposed on the fiber.

In a second aspect, there is provided a method for preparing a fiber-reinforced brittle matrix composite. The method comprises providing a fiber, disposing a coating material on the fiber to form a coated fiber, wherein the coating material is non-covalently disposed on the fiber, and embedding the coated fiber in a brittle matrix material to obtain the fiber-reinforced brittle matrix composite.

BRIEF DESCRIPTION OF FIGURES

The invention will be better understood with reference to the detailed description when considered in conjunction with the non-limiting examples and the accompanying drawings, in which.

DETAILED DESCRIPTION

In this disclosure, a fiber-reinforced brittle matrix composite such as a cementitious material—fiber composite is provided, with the object of preventing or reducing interfacial slip, thereby enhancing fiber/brittle matrix material interaction. Improvement in interfacial adhesion has been demonstrated using a method disclosed herein.

Accordingly, in a first aspect, there is provided a fiber-reinforced brittle matrix composite. The fiber-reinforced brittle matrix composite comprises a brittle matrix material and a coated fiber embedded in the brittle matrix material, wherein the coated fiber comprises a fiber and a coating material which is non-covalently disposed on the fiber.

Advantageously, by disposing or depositing the coating material non-covalently on the fiber, the coated fiber of the present disclosure is particularly suitable to reinforce a brittle matrix material such as a cementitious material by bridging nano-cracks, filling nano-pores and serving as seeds to promote hydration, as opposed to use of neat fibers, i.e. uncoated fibers, or fibers modified with a material which is covalently grafted or grown thereon. As the coating material is not covalently adhered to the fiber, at least some of the coating material may remain mobile. As such, some of the coating material may move away from the fiber and thus be able to densify an otherwise weak interface transition zone (ITZ) between the fiber and the brittle matrix material.

Figure 11:
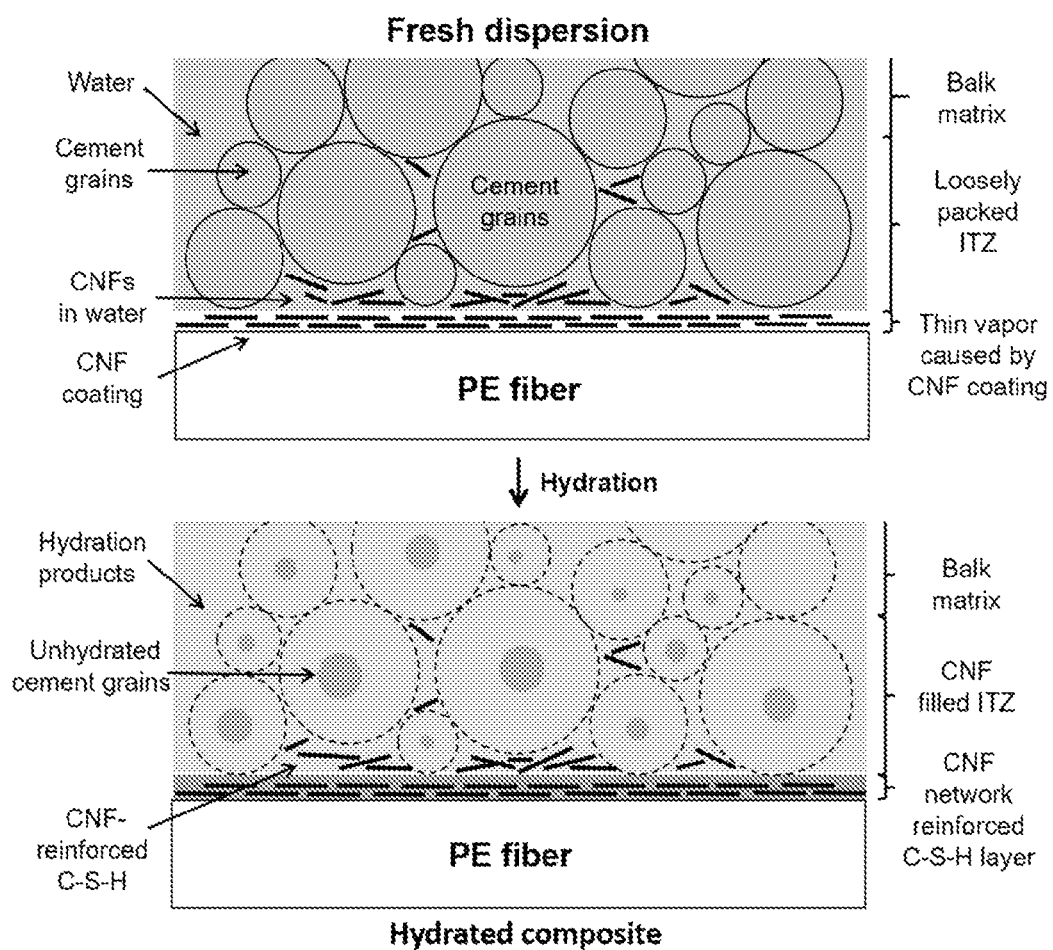
FIG. 11 is a schematic illustration of the hierarchical structure near ITZ in CNF-SHUHPC.

Further, as the coating material is not added as a separate component along with fiber to the brittle matrix material, but is rather disposed on the fiber as a coating material, a hierarchical structure of the coating material may be created. The hierarchical structure, showing different degrees of infiltration of the coating material, is shown in FIG. 11. Concentration of the coating material may be increased, and may be more localized near the ITZ where weak interactions are observed. The coating material which is non-covalently disposed on the fiber is therefore able to act directly at the location where weak interactions are otherwise observed. Due to the strengthening of the interaction in the ITZ, the interface frictional bond strength between the brittle matrix material and the fiber may be enhanced, which improves the performance of the fiber-reinforced brittle matrix composite.

Figure 1:
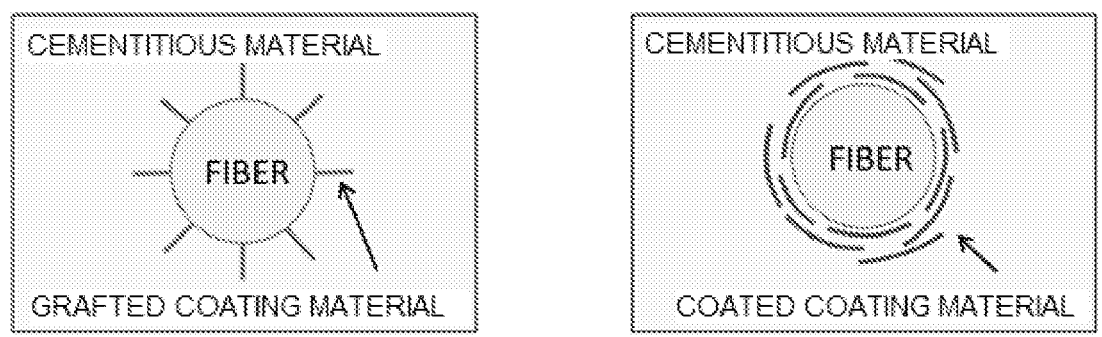
FIG. 1 is a schematic illustration of the difference in orientation between a fiber with a coating material being grafted thereon, and a fiber with a coating material being disposed thereon.

Furthermore, as compared to situations in which the coating material is grafted or grown on the fiber, by depositing the coating material non-covalently on the fiber, a large proportion of the coating material may be longitudinally oriented, which is considered to be more beneficial to prevent or reduce the formation and propagation of tunnelling cracks. FIG. 1 illustrates the different orientations of the coating material. The illustration shown on the left depicts the radial orientation of the coating material when the coating material is grafted or grown on the fiber, while the illustration shown on the right side depicts the longitudinal orientation of the coating material as disclosed in the present application.

The above translates into use of a low dosage or concentration of fibers in preparing the fiber-reinforced brittle matrix composite, which is advantageous in that it reduces material cost and is easier to process, while bond strength between the fibers and the brittle matrix is maintained or increased.

With the above in mind, the term "composite" as used herein refers to a construct including a fibrous component in the form of a coated fiber and a brittle matrix material component. The components in the composite may be physically mixed together to form the composite. By the term "physically mixed", it is meant that the brittle matrix material component and the fibrous component are merely dispersed in one another, and do not chemically react to form a new material.

The fiber-reinforced brittle matrix composite comprises a brittle matrix material and a coated fiber embedded in the brittle matrix material. The term "brittle matrix material" as used herein refers to a material which breaks, cracks, fractures, snaps or otherwise is damaged without or with only negligible plastic deformation upon application of a force. The brittle matrix material may, for example, comprise a cementitious material or a ceramics material.

In various embodiments, the brittle matrix material comprises a cementitious material. In some embodiments, the brittle matrix material is a cementitious material. The term "cementitious material" as used herein refers generally to a mixture containing one or more of concrete, paste, grout, mortar, or plaster, which can be used to make a construction element. For example, the cementitious material may be a substance that sets and hardens as it reacts, and may accordingly act as a binder for binding or holding other components in the composite together. Cementitious materials may also comprise hydraulic cement or supplementary cementitious materials (SCM) including fly ash, ground granulated blast furnace slag, limestone, silica fume etc. The hydraulic cement or supplementary cementitious materials (SCM) may be materials that set and harden by reacting chemically with water. A further component of the cementitious materials may include alkali-activated materials and geopolymers, which use SCMs, metakaolin, or any aluminosilicate rich ingredients as precursors.

In various embodiments, the brittle matrix material comprises a ceramics material. In some embodiments, the brittle matrix material is a ceramics material. As used herein, the term "ceramics" refers to substantially inorganic nonmetallic material, and includes conventional clay ceramics. The ceramics material may, for example, be selected from the group consisting of boride-based ceramics, carbide-based ceramics, nitride-based ceramics, oxide-based ceramics, and a combination thereof.

In some embodiments the brittle matrix material may comprise a cementitious material, while not containing a ceramics material. In some embodiments, the brittle matrix material may comprise a ceramics material, while not containing a cementitious material.

In various embodiments, the brittle matrix material is a cementitious material comprising a cement-based material. The cement-based material may be a mixture of limestone and clay or some similar material used to make mortar, concrete, or the like, or be a mixture of gravel and/or sand to form a cement aggregate. The cement-based material may have a high percentage of inorganic salts. In particular, limestone may comprise a high percentage, or consists essentially of calcium carbonate, while mortar comprises a high percentage of calcium silicates. In some embodiments, the cement-based material comprises Portland cement, which comprises a high percentage of calcium silicates ($CaO \cdot SiO_2$).

The brittle matrix material may further comprise a silica-containing material. The silica-containing material may be selected from the group consisting of silica fume, silica flour, micro silica sand and a combination thereof. Advantageously, by adding a silica-containing material to the brittle matrix material, the interface transition zone may be strengthened.

In various embodiments, the brittle matrix material may further comprise a plasticizer. The term "plasticizer" may refer to one or both of a water-reducer and a superplasticizer. Examples of water-reducers may include, but are not limited to, lignosulfonates, hydroxycarboxylic acids, hydrocarbons and other specialized organic compounds, such as glycerol, polyvinyl alcohol, sodium alumino-methyl-siliconate, sulfanilic acid and casein, or a combination thereof. Examples of a superplasticizer may include, but are not limited to, a melamine-based superplasticizer, a polycarboxylate-based superplasticizer, a naphthalene-based superplasticizer, or a combination thereof. In particularly preferred embodiments, the plasticizer may be a polycarboxylate-based superplasticizer.

The brittle matrix material may act as a matrix for embedding a coated fiber, which comprises a fiber and a coating material which is non-covalently disposed on the fiber. The term "fiber" as used herein refers to a class of materials, that may be natural or synthetic, that are in discrete elongated pieces. The coated fiber may act as a reinforcement material for a brittle matrix material. As mentioned above, addition of coated fiber to the brittle matrix material such as a cementitious material or a ceramics material may be carried out for mechanical reinforcement and also electrical conductivity enhancement. The fiber may, for example, be a metallic fiber such as a steel fiber, an inorganic fiber such as a glass fiber, a polymeric fiber such as a polyethylene fiber or a polypropylene fiber, or a carbon fiber. In various embodiments, the fiber is selected from the group consisting of steel fiber, polyethylene fiber, polypropylene fiber, polytetrafluoroethylene fiber, polyacrylate fiber, polyester fiber, carbon fiber, glass fiber, silicon carbide fiber, alumina fiber, and mullite fiber.

In various embodiments, the fiber is a carbon-based fiber. Preferably, the carbon-based fiber may comprise a carbon-based polymer, otherwise termed herein as an organic polymer. In some embodiments, the carbon-based fiber comprising the carbon-based polymer may be selected from the group consisting of polyethylene fiber, polypropylene fiber, polytetrafluoroethylene fiber, polyacrylate fiber, polyester fiber and combinations thereof. Preferably, the carbon-based fiber comprising the carbon-based polymer may be polyethylene (PE) fiber.

Advantageously, PE fiber has high fiber strength of 3000 MPa, which renders it a good candidate as fiber for reinforcing a brittle matrix material. Due to its smooth and hydrophobic surface, however, interfacial bond between fiber and inorganic matrix may be limited, which may result in use of a higher fiber dosage and increased fiber length in order to prepare high-strength high-ductility fiber-reinforced brittle matrix composites. This introduces significant processing and cost issues to ensure sufficient fiber-bridging. In addition, larger crack widths of few hundred micrometers may be observed in PE fiber-reinforced SHCC due to the weaker interfacial bond, which leads to higher transport properties and loss of autogenous crack healing potential. Accordingly, using embodiments disclosed herein whereby a coating material is non-covalently disposed on the fiber, interface frictional bond strength between the brittle matrix material and the fiber may be enhanced, which improves the performance of the fiber-reinforced brittle matrix composite.

The fiber may have a length of about 100 μm to about 1000 mm, preferably in a length of about 500 μm to about 1000 mm, about 1 mm to about 1000 mm, or of about 1 mm to about 100 mm, or of about 1 mm to about 60 mm, or of about 1 mm to about 40 mm, or of about 1 mm to about 20 mm, or of about 1 mm to about 8 mm, or of about 10 mm to about 20 mm, or of about 10 mm to about 400 mm, or of about 10 mm to about 200 mm, or of about 100 to about 200 nm. In various embodiments, the fiber is provided in a length of about 150 mm. In some embodiments, the fiber is provided in a length of about 4 mm, 6 mm, 8 mm or 19 mm.

A coating material is non-covalently disposed on the fiber. The term "disposing" or "disposed" as used herein refers generally to the act of arranging a coating material on the fiber, and is defined herein as not including formation of a covalent bond between the coating material and the fiber. The term "coating material" as used herein refers to any material which is not repulsed by the fiber material, and is accordingly able to be disposed on the fiber. As mentioned above, because the coating material is not covalently bonded to the fiber, a large proportion of the coating material may be arranged in a longitudinal direction as a coating on the fiber, as opposed to being arranged radially extending from it. Illustratively, this is shown in FIG. 1.

The coating material may be a carbon-based coating material or a carbon-based nanomaterial. In various embodiments, the coating material is selected from the group consisting of graphite, charcoal, single-wall carbon nanotubes (SWCNTs), multi-wall carbon nanotubes (MWCNTs), carbon nanofibers (CNFs), fullerene, graphene, and a combination thereof.

The coating material may, for example, be a carbon-based coating material, which may be selected from the group consisting of graphite, charcoal and a combination thereof.

In some embodiments, the coating material is a carbon-based nanomaterial, which may be selected from the group consisting of single-wall carbon nanotubes (SWCNTs), multi-wall carbon nanotubes (MWCNTs), carbon nanofibers (CNFs), fullerene, graphene, and a combination thereof.

The non-covalent interaction between the coating material and the fiber may be an attractive interaction. The term "attractive interaction" as used herein refers to any interaction between the coating material and the fiber that does not involve sharing of electrons, while resulting in adherence of the two materials. For example, such non-covalent interaction may include hydrophobic interaction, hydrophilic interaction, ionic interaction, hydrogen bonding, and/or van der Waals interaction.

In various embodiments, the non-covalent attractive interaction is a hydrophobic interaction. The hydrophobic interaction may exist between two materials which are substantially non-polar (or have a low dipole moment), particularly in a hydrophilic environment such as in water or in a brittle matrix material such as a cementitious material or a ceramics material.

In various embodiments, the non-covalent attractive interaction is a hydrophilic interaction. The hydrophilic interaction may exist between two materials which are substantially polar (or have a high dipole moment), particularly in a hydrophobic environment such as in an organic polymer or a carbon-based polymer.

In various embodiments, the non-covalent attractive interaction is an ionic interaction and/or hydrogen bonding. The ionic interaction may exist between two materials having opposite charges or partial charges, such that the materials may adhere to each other by ionic interaction or hydrogen bonding.

In specific embodiments, the non-covalent attractive interaction is a hydrophobic interaction.

In particular embodiments, the coating material is a carbon nanofiber. Advantageously, carbon nanotubes (CNTs) and carbon nanofibers (CNFs) may be incorporated as a coating material which is non-covalently disposed on a fiber embedded in the brittle matrix material to improve the mechanical properties at the nanoscale. These carbon-based fibrous materials may reinforce the matrix by bridging nano-cracks, filling nano-pores and serving as seeds to promote hydration. Further advantageously, the cup-stacked structure of CNFs may contain more carbon edges that could prevent interfacial slip and thus enhance nano-fiber/brittle matrix material interaction.

In embodiments wherein the coating material may be a carbon-based coating material and the fiber may be a carbon-based fiber, the non-covalent attractive interaction between the two components may be a hydrophobic interaction. Advantageously, this interaction may result in a comparatively stronger interaction than a 'neutral' interaction and may ensure that the carbon-based coating material during the disposing adheres to the fiber.

In embodiments wherein the brittle matrix material comprises or consists of a cementitious material, such as a cement-based material, for example, Portland cement, the fiber may be polyethylene fiber, and the coating material may comprise carbon nanofibers.

In embodiments wherein the brittle matrix material comprises or consists of a ceramics material, fibers such as glass fibers, silicon carbide (SiC) fibers, alumina ($Al_2O_3$) fibers, and/or mullite ($Al_2O_3$—$SiO_2$) fibers may be used. It is mentioned herein that fibers with low melting point such as polyethylene fibers may not be used in embodiments wherein sintering is carried out to form the brittle matrix material since the fibers may melt during sintering where temperatures are typically high, such as at least 750° C. A coating material such as carbon nanoubes may be non-covalently disposed on the fiber. In various embodiments, the coated fiber may comprise a glass fiber having a coating material of carbon nanotubes which is non-covalently disposed on the fiber. One or more of the above-mentioned non-covalent interactions may be present between the fiber and the coating material.

According to various embodiments, the coating material may be arranged in layers surrounding the fiber. Each of the layers may independently have a thickness of about 1 nm to about 1000 nm, preferably of about 10 nm to about 1000 nm, more preferably of about 10 nm to about 500 nm, or of about 10 nm to about 300 nm, most preferably of about 10 nm to about 100 nm.

The coating material surrounding the fiber may have a total thickness of about 10 nm to about 10 μm, or preferably of about 50 nm to about 5 μm, or of about 50 nm to about 3 μm, most preferably of about 100 nm to about 1000 nm.

As mentioned above, the brittle matrix material may comprise, or may be at least substantially, or may consist entirely of an inorganic salt. In these embodiments, the brittle matrix material may be a hydrophilic material, wherein the hydrophilicity may arise from the presence of inorganic salts having a higher dipole moment than organic polymers of the fiber. In some embodiments, the fiber may comprise or be formed entirely of a hydrophobic material. The hydrophobicity may arise from long carbon chains within the fiber, which may have a lower dipole moment than, for example, inorganic salts of the brittle matrix material.

According to various embodiments, the coated fiber may be embedded in the brittle matrix material and kept in place within the matrix formed by the brittle matrix material through friction. The term "friction" as used herein may refer to the force that resists relative motion between the brittle matrix material and the coated fiber which are in contact with each other. The frictional force is independent of any attractive interaction between the coated fiber and the brittle matrix material, and exists to impede movement between the coated fiber and the brittle matrix material. The frictional forces that exist between the coated fiber and the brittle matrix material may depend on the type of coating material used, and effective surface area between the coating material and the brittle matrix material, for example. Advantageously, by using a coated fiber rather than a pristine fiber, effective surface area between the coating material and the brittle matrix material may be increased, translating to an increase in friction between the coated fiber and the brittle matrix material.

More particularly, the use of a coating material means that fibers which may have a repulsive interaction with the brittle matrix material may be used, since the coating material may serve to shield or mitigate the repulsive interaction to allow embedding of the coated fibers in the brittle matrix material.

In a second aspect, there is provided a method for preparing a fiber-reinforced brittle matrix composite. The method comprises providing a fiber, disposing a coating material on the fiber to form a coated fiber, wherein the coating material is non-covalently disposed on the fiber, and embedding the coated fiber in a brittle matrix material to obtain the fiber-reinforced brittle matrix composite. Examples of suitable fibers, coating materials, and brittle matrix material have already been discussed above.

The method disclosed herein has advantages of feasibility and efficiency over methods such as grafting, in which the coating material is covalently adhered to the fiber. For example, the grafting process may involve oxidation of fiber surface, deposition of metal catalyst, and growth of CNT in a furnace at very high temperatures of 750° C. Such processes are complex, and the high temperature treatment may result in undesirable melting of polymeric fibers. The method disclosed herein is also advantageous over growth methods, such as CNT growth, which may reduce strength of the CNT fiber due to catalyst etching. In contrast thereto, the method of preparing a fiber-reinforced brittle matrix composite disclosed herein are carried out under much milder conditions.

In various embodiments, the coating material may self-assemble in aqueous environment at normal temperature as a result of the hydrophobic interaction. The term "self-assembly" refers to a process of spontaneous organization of components of a higher order structure by reliance on the attraction of the components for each other, and without chemical bond formation between the components. For example, coating materials comprising polymer chains may interact with each other via any one of hydrophobic forces, hydrogen bonding, van der Waals interaction, electrostatic forces, or polymer chain entanglement, induced on the polymer chains, such that the polymer chains may aggregate or coagulate in an aqueous medium to form the coating material.

In various embodiments, providing the fiber comprises providing the fiber in a length of about 100 µm to about 1000 mm. For example, the fiber may be provided in a length of about 100 µm to about 1000 mm, preferably in a length of about 500 µm to about 1000 mm, about 1 mm to about 1000 mm, or of about 1 mm to about 100 mm, or of about 1 mm to about 60 mm, or of about 1 mm to about 40 mm, or of about 1 mm to about 20 mm, or of about 1 mm to about 8 mm, or of about 10 mm to about 20 mm, or of about 10 mm to about 400 mm, or of about 10 mm to about 200 mm, or of about 100 to about 200 nm. In various embodiments, the fiber is provided in a length of about 150 mm. In some embodiments, the fiber is provided in a length of about 4 mm, 6 mm, 8 mm or 19 mm.

The coating material to be deposited, on the other hand, may be provided in a thickness of up to 10 µm, preferably up to 1 µm, more preferably up to 200 nm.

According to various embodiments, disposing the coating material on the fiber is carried out by a method selected from the group consisting of dip coating, die coating, extrusion coating, and a combination thereof.

Disposing the coating material on the fiber may further comprise contacting the fiber with the coating material in a solvent which exhibits a repulsive interaction with the fiber and the coating material. The term "repulsive interaction" as used herein is the opposite of "attractive interaction", and is used to describe any interaction resulting in two or more materials to avoid contact and move away from each other.

The repulsive interaction may, for example, exist between a hydrophobic material and a hydrophilic material. In this case, one of the two components may be substantially non-polar (or have a low dipole moment), while the other component may be substantially polar (or has a high dipole moment). For example, in cases where there are hydrophobic components positioned in a hydrophilic environment, the hydrophobic components may adhere to each other so as to avoid contact with the hydrophilic environment. The hydrophobic components may, for example, be in the form of a carbon-based coating material and a carbon-based fiber, while the hydrophilic environment may be in the form of water or a brittle matrix material disclosed herein.

In some embodiments, the repulsive interaction may be an ionic interaction. In this case, two materials, which have the same charges or partial charges, may repel each other by ionic interaction.

In embodiments wherein the coating material is a carbon-based coating material and the fiber is a carbon-based fiber, both components are hydrophobic. As such, contacting the carbon-based fiber with the carbon-based coating material in a hydrophilic solvent may result in adherence of the carbon-based coating material to the carbon-based fiber due to presence of a repulsive interaction with the hydrophilic solvent. Advantageously, this repulsive interaction may result in self-assembly of the carbon-based coating material on the carbon-based fiber.

A hydrophilic solvent may include, but is not limited to, water, methanol, ethanol, n-propanol, isopropanol, n-butanol, tert-butanol, ammonia, acetic acid and a combination thereof. In preferred embodiments, the hydrophilic solvent may be water.

The method may further comprise removing the solvent after disposing the coating material on the fiber to obtain the coated fiber.

In various embodiments, the brittle matrix material is a cementitious material comprising a solvent, such as water.

The method may further comprise embedding the coated fiber in the brittle matrix material, wherein the coated fiber is added in a gradual manner to the brittle matrix material. For example, the coated fiber may be added under stirring to the brittle matrix material, and which may be carried out over a period of time in the range of minutes or hours, in order to more evenly disperse the coated fiber in the brittle matrix material.

In embodiments wherein the brittle matrix material is a ceramics material, following embedding the coated fiber in the brittle matrix material, the resultant mixture may be sintered, which may be carried out at a temperature of at least 750° C., such as a temperature in the range of about 750° C. to about 950° C., about 800° C. to about 950° C., about 850° C. to about 950° C., or about 750° C. to about 850° C.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

Hereinafter, the present disclosure will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

EXAMPLES

An idea of using carbon nanofibers (CNFs) to strengthen the interface transition zone (ITZ) and to enhance the interface frictional bond strength between polyethylene (PE)

fibers and cement-based matrix was proposed and realized by coating CNFs on surface of PE fibers through hydrophobic interactions. A strain hardening ultra-high performance concrete (SHUHPC) incorporating such CNF-coated PE fibers was developed. The resulting CNF-SHUHPC has a compressive strength over 150 MPa and exhibits 15% enhancement in tensile strength, 20% improvement in tensile strain capacity, and reduced cracking spacing. Single fiber pullout tests showed the interface frictional bond strength of the CNF-coated PE fiber was increased by 22%, which is attributed to CNFs strengthening the ITZ by filling nano-pores and bridging nano-cracks resulting in denser microstructure and higher crack resistance against fiber pullout as revealed by the micrographs. The increased interface frictional bond strength leads to higher tensile strength and increased tensile strain capacity as predicted by the micromechanical model.

Uniqueness of the Disclosure

In this disclosure, a process of introducing nanomaterials on the surface of fibers to reinforce the microstructure of fiber/matrix interfacial transition zone and thus enhance the interfacial bond between fiber and matrix is disclosed. Instead of grafting the nanomaterials onto the fiber surface, a more practical approach of coating the nanomaterials on the fiber surface through hydrophobic interactions was disclosed.

Advantages and Improvements

The process disclosed in current application has advantages over existing methods in terms of both feasibility and efficiency. It was reported that the grafting process consists of oxidation of fiber surface, deposition of metal catalyst, and growth of CNT in a furnace at 750° C. Despite the complexity of the processing, the high temperature treatment could result in melt of a wide range of polymeric fibers, which may severely hinder the application of this method. Also, the CNT growth reaction has also been reported to reduce the fiber strength due to catalyst etching. In contrast, the CNTs coated through the process disclosed in present application are self-assembled in aqueous environment at normal temperature as a result of the hydrophobic interaction.

In addition, grafting the CNTs on the surface of the fiber could only provide CNTs with a radial orientation. Conversely, if CNTs were coated onto the surface of fiber, a large proportion of CNTs would be longitudinally oriented, which is considered to be more beneficial to prevent the formation and propagation of tunnelling cracks. FIG. 1 gives a comparison of different coating material orientations.

Technical Description of the Disclosure

Practice of the present disclosure provides a method to enhance interface bond between fiber and brittle matrix by using nanomaterials to reinforce the microstructure of fiber/matrix interfacial transition zone by means of coating the fiber surface with layers of carbon nanomaterials (CNMs). This method can increase the interfacial bond strength by at least 20% and thus improve the composite delamination resistance. The design of such method is based on the understanding of the micro-mechanisms governing the fiber/matrix interaction and also the coating mechanism of the hydrophobic interaction between fibers and CNMs.

The coating process may include the preparation of CNMs solution, coating fiber with CNMs solution and control over thickness of coating layers. The CNMs solution may be manufactured by mixing CNMs in a solvent. The CNMs can be mixed in a solvent by various equipment, including, without limitation, high shear mixer, ultrasonic homogenizers, and other similar apparatus. The solvent is preferably distilled water. Additives may or may not be included in the solution. The coating can occur by, but is not limited to, dip coating, die coating, extrusion coating, and combinations thereof. An exemplary dip coating method is described in more detail in the example below. The coating thickness may be controlled by adjusting the solution concentration, coating time and coating speed. In some embodiments, if components of the matrix are sensitive to the solvent, the method of the present disclosure may also include a step of removing the solvent after the formation of the CNMs layers on the surface of the fiber.

The carbon nanomaterials may comprise at least one of the allotropes of carbon with at least one dimension in the size range up to 1000 nm, preferably 100 nm. Examples of carbon nanomaterials may include, but are not limited to, single-wall carbon nanotubes (SWCNTs) and multi-wall carbon nanotube (MWCNTs), carbon nanofibers (CNFs), fullerene, graphene, and combinations thereof. An oxidation process may or may not be incorporated to the carbon nanomaterials.

The carbon nanomaterial layers preferably have a thickness of about 100-1000 nm, more preferably of about 200-900 nm, and most preferably of about 300-800 nm. The carbon nanomaterials layers may include a network of interconnected carbon nanomaterials or bundled carbon nanomaterials. The layers may uniformly and seamlessly cover the entire surface of fiber or partly cover the fiber.

The fiber may be one or more of any suitable discontinuous and continuous fibers. Examples of fibers include, but are not limited to, carbon fiber, polyethylene fiber, polypropylene fiber. The optimal coating time may vary, depending on the chemical activity of fiber surface. The purpose of adding fiber may be mechanical reinforcement and also electrical conductivity enhancement.

The matrix may include any inorganic, nonmetallic, solid materials which are brittle such as ceramic materials including but not limited to boride-, carbide-, nitride-, oxide-based ceramics and cement-based materials.

To introduce highly concentrated CNFs on the PE fiber/matrix interface, in this study, a simple method to coat CNFs on the surface of PE fibers through hydrophobic interactions is proposed. A strain hardening UHPC (SHUHPC) incorporating 1.5 vol. % of such CNF-coated PE fibers was prepared and the mechanical performance and damage pattern were documented and compared with the control mix where pristine PE fibers were used as reinforcement. Single fiber pullout tests were carried out to quantitatively evaluate the changes of interfacial bond due to the presence of the CNFs in the fiber/matrix interface. Scanning electron microscopy (SEM) was used to reveal microstructure of fiber/matrix interface. Strain hardening potential of SHUHPC was calculated by means of a micromechanics-based model.

EXPERIMENTAL PROGRAM

Example 1

Mix Design and Materials

Table 1 shows the mixture compositions of SHUHPC, which were tailored based on a UHPC mix, as detailed herein. The composites under investigation consist of CEM I 52.5N Portland cement, silica fume, silica flour and micro silica sand. Silica flour is powdered crystalline silica with a particle size distribution ranging from 0.1 to 100 μm. Finely graded micro silica sand has an average particle size of 150 μm. A polycarboxylate-based superplasticizer (SP) with 30.0% solid content by mass was used to reach desired workability. 1.5 vol. % of 19-mm-long high-strength high-modulus PE fibers with a diameter of 23 μm were used to produce the composites. The SHUHPC matrix has a water-to-binder ratio of below 0.2 and a filler-to-binder ratio of 0.4 to achieve ultra-high strength. The binder consists of 90 wt. % of CEM I 52.5N Portland cement and 10 wt. % of silica fume (Elkem Microsilica Grade 940U). Silica fume was used to strengthen the interface transition zone. The filler comprises 75% of silica flour and 25% of micro silica sand. Silica flour is powdered crystalline silica with a particle size distribution ranging from 0.1 to 100 μm, while micro silica sand has an average particle size of 150 μm. The finely graded fillers increase the packing density and thus improve rheological properties of fresh paste. A polycarboxylate-based superplasticizer (SP) produced from Grace with 30.0% solid content by mass was used to reach desired workability.

TABLE 1

Mixture compositions of SHUHPC [unit in kg/m$^3$]

| Mixture ID | Cement | Silica fume | Silica flour | μ-silica sand | Water | SP | PE fiber (1.5 vol. %) | CNF coating |
|---|---|---|---|---|---|---|---|---|
| SHUHPC | 1289 | 143 | 430 | 143 | 284 | 22 | 14 | No |
| CNF-SHUHPC | 1289 | 143 | 430 | 143 | 284 | 22 | 14 | Yes |

To achieve high ductility, 1.5 vol. % of 19-mm-long high-strength high-modulus PE fibers (Spectra® 1000, Honeywell) with a diameter of 23 μm were used to produce SHUHPC. Table 2 summarizes the physical properties and geometry of PE fibers used in this study. As can be seen, Spectra® 1000 PE fiber has a very high tensile strength of 3250 MPa due to the use of ultra-high-molecular-weight PE resin for the production of fibers through a gel-spinning process.

TABLE 2

Properties of the PE fibers (Spectra ® 1000, Honeywell)

| Diameters (μm) | Length (mm) | Tensile strength (MPa) | Elastic modulus (GPa) | Density (g/cm$^3$) |
|---|---|---|---|---|
| 23 | 19 | 3250 | 113 | 0.96 |

CNFs used in this study were sourced locally (ceEntek Pte Ltd). Table 3 summarizes the properties of CNF and its suspension. CNFs were produced by catalytic chemical vapor deposition of a hydrocarbon over a surface of a metal catalyst. The resulting CNFs had diameters of 50 to 200 nm and an average length of 10 μm. CNFs were then dispersed in distilled water through ultrasonication without surface modification and addition of surfactant. The resulting suspension has a concentration of 3 kg/m$^3$ and a pH around 6.

TABLE 3

Properties of CNF and its suspension

| CNF | | | CNF suspension | |
|---|---|---|---|---|
| Diameter (nm) | Ave. length (μm) | Surface area (m$^2$/g) | Concentration (kg/m$^3$) | pH |
| 50-200 | 10 | 120-130 | 3 | 5.6-6.2 |

Example 2

Specimen Preparation

Figure 2:
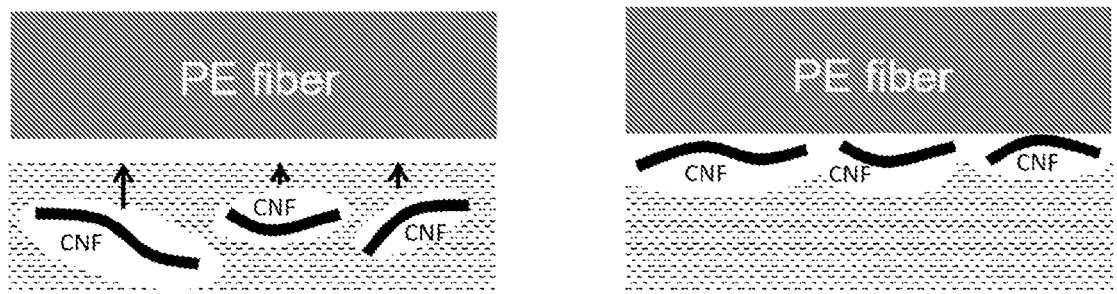
FIG. 2 is an illustration of hydrophobic interactions between polyethylene (PE) fibers and carbon nanofibers (CNFs) in water.

CNFs were coated on the surface of PE fibers through hydrophobic interaction, where PE fibers were immersed in CNF suspension and manually shaken for 5 minutes. After which, the solution was filtered and fibers were collected and dried in an oven at 80° C. for 6 hours. It was observed that hydrophobes tend to clump up together in a water medium so that they may have minimal contact with water to reach a lower energy status and thus an attractive force was created between the hydrophobes. Strong attractive force has been reported between CNF and PE fibers in aqueous solution. When PE fibers and CNFs are simultaneously immersed in aqueous environment, the loss of hydrogen bonds near the two extended hydrophobic surfaces could cause water to move away from the hydrophobic surfaces and thus produce thin vapor layers between the two substances resulting in strong adhesion between PE fibers and CNFs as depicted in FIG. 2. Similar approaches have been applied to produce electrically conductive flexible films. CNT-coated polyethylene terephthalate (PET) and polyethylene naphthalate (PEN) were developed by dipping the polymer substrates into CNT suspension. It was concluded the thickness of CNT coating is directly proportional to the hydrophobicity of the substrate. It should be noted that the process conditions adopted in current study may not necessarily be the optimum conditions. Further study is needed to understand how factors, such as CNF suspension concentration, pH value, fiber surface zeta potential, and the hydrophobicity of CNFs, govern the properties of the coating layer.

To prepare SHUHPC, cement, silica fume, silica flour, and micro silica sand were dry-mixed by a planetary mixer for 5 minutes first. Water pre-mixed with 80% of SP was slowly added into the mixture and mixed until the fresh paste was homogenous and consistent. Fibers were then gradually added and mixed for another 5 minutes. Meanwhile, the remaining 20% SP was added into the mixture to compensate rheological loss due to the addition of fibers. Afterward, the mixture was cast into 50 mm cubic and dog bone (150 mm×35 mm×15 mm in gauge length area) molds while moderate vibration was applied to remove entrapped air and to improve consolidation. The molds were covered with plastic sheets and cured in air at room temperature for one day. The hardened specimens were then removed from the molds and cured in lime-saturated water for another 27 days in the laboratory at a temperature of 23±3° C. before testing.

Figure 3A:
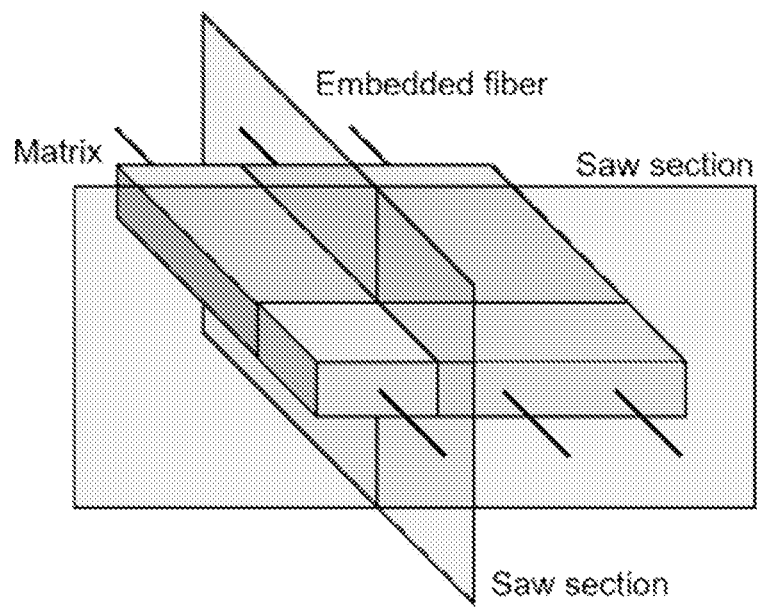
FIG. 3A is a schematic diagram illustrating the single fiber pullout specimen.
Figure 3A:
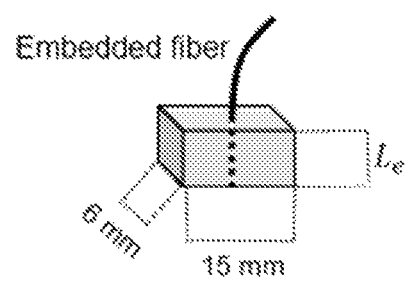

Preparation of single fiber pullout specimens followed the suggestion of reference. A long PE fiber was cut into about 150 mm in length and embedded into the SHUHPC matrix (same mix composition as in Table 1 but without the addition of PE fiber) as shown in FIG. 3A. The hardened specimen was demolded after one day and cured in the same condition as described above. The specimens were sawed into thin specimens (0.6-9 mm in thickness) with a single fiber extruded out from one side.

Example 3

Tests

Compressive strength test was conducted in accordance with ASTM C 109. The loading of compression test was controlled at the rate of 100 kN/min Uniaxial tension tests were performed using a MTS hydraulic testing machine with 250 kN capacity under displacement control with a rate of 0.2 mm/min. Two linear variable differential transducers (LVDTs) were attached to both sides of the tensile specimens to monitor the deformation of the sample with a gage length of 150 mm. At least three samples were tested for each mixture and the average and the standard deviation were reported.

Figure 3B:
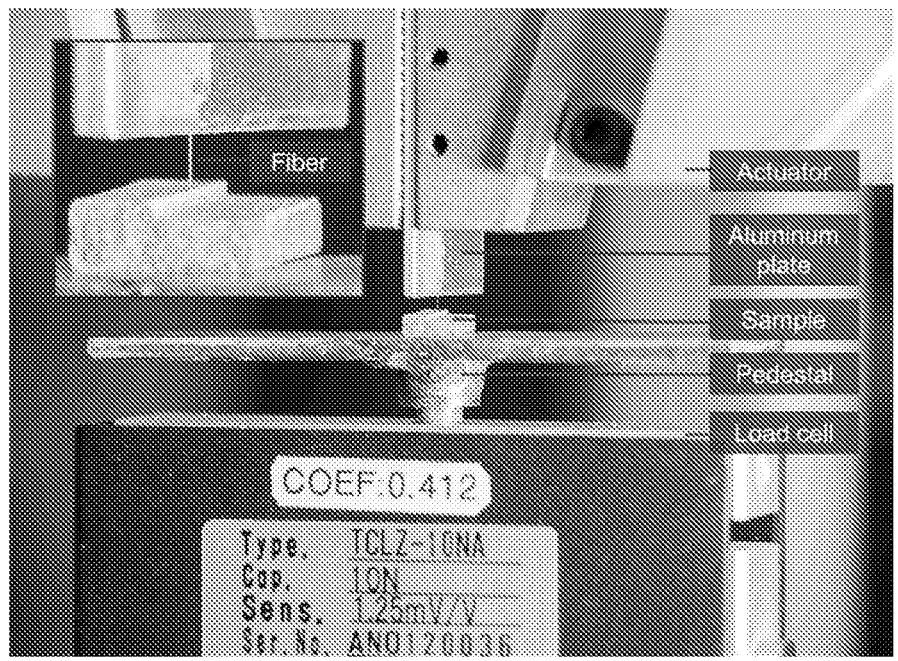
FIG. 3B is a photograph of the experimental setup of the single fiber pullout test.

Single fiber pullout test was carried out to determine the interface frictional bond strength between the PE fiber (pristine and CNF-coated) and the SHUHPC matrix. The setup of single fiber pullout test is shown in FIG. 3B. The free end of the fiber was glued onto an aluminum plate, which was held by the upper gripper of a universal testing machine (UTM). The single fiber pullout specimen was glued to a pedestal which was screwed into a high-precision load cell with a maximum capacity of 10 N. The load cell was attached to an x-y displacement stage that was held by the bottom grip of the UTM. 24 specimens with different embedment lengths of 0.6 to 9 mm of each mixture were tested. The interface frictional bond strength $\tau_0$ can be determined by the following equation, $$\tau_0 = P_{peak}/\pi d_f L_e \quad (1)$$

where $P_{peak}$ is the peak pullout force, $L_e$ is the fiber embedment length and $d_f$ is the fiber diameter.

Optical microscope (OLYMPUS BX51) and field emission scanning electron microscope (FESEM, JEOL JSM-7600F) were used to investigate the CNF coating on the surface of PE fiber and to study the microstructure of interface between PE fiber and SHUHPC matrix from the single fiber pullout specimens. After the single fiber pullout tests, the specimens were cleaved through the fiber tunnel so that the fiber/matrix interface was exposed and examined under SEM.

Example 4

Micromechanics-Based Modeling of Strain Hardening Potential

Tensile strain hardening of cement-based material is a result of sequential development of parallel steady-state cracks. The condition for steady-state cracking was quantitatively analyzed by Marshal and Cox based on the J-integral method, which can be expressed as Eqn. 2.

$$\frac{K_m^2}{E_m} = J_{tip} \leq \sigma_0 \delta_0 - \int_0^{\delta_0} \sigma(\delta) d\delta \equiv J_b' \quad (2)$$

It indicates that the complementary energy of fiber-bridging $J_b'$ must exceed the crack tip toughness $J_{tip}$, which is approximately equal to the matrix toughness $K_m^2/E_m$ at small fiber content, where $K_m$ is the matrix fracture toughness and $E_m$ is the matrix Young's modulus. The $\sigma(\delta)$ curve, which can be viewed as the constitutive law of fiber-bridging behavior, is expressible as a function of a set of micromechanics parameters including interface frictional bond strength $\tau_0$ and snubbing coefficient f accounting for the interaction between fiber and matrix when pulled at an inclined angle. Besides interfacial properties, the $\sigma(\delta)$ curve is also governed by the matrix Young's modulus $E_m$, fiber content $V_f$, fiber diameter $d_f$, fiber length $L_f$, and fiber Young's modulus $E_f$. A numerical procedure followed Qiu et al. was used to calculated the $\sigma(\delta)$ curve. In addition, the fiber-bridging strength $\sigma_0$ along the crack plane must be higher than the matrix cracking strength $\sigma_c$ to allow the initiation of crack propagation from a matrix flaw. This consideration leads to the second criterion for strain hardening as Eqn. 3.

$$\sigma_c \leq \sigma_0 \quad (3)$$

Equations 2 and 3 are referred to as the energy criterion and the strength criterion of pseudo strain hardening, respectively. Satisfaction of both is necessary to achieve tensile strain hardening behavior. The pseudo strain hardening (PSH) performance indices are often used to quantitatively evaluate the likelihood and robustness of strain hardening behavior.

$$PSH_{energy} = \frac{J_b'}{J_{tip}} \quad (4)$$

$$PSH_{strength} = \frac{\sigma_0}{\sigma_c} \quad (5)$$

Theoretically, strain hardening behavior would occur given both PSH indices are larger than unity. Due to random nature of pre-existing flaw size and fiber distribution in cement composites, however, large margins are preferred to ensure saturated multiple cracking and high tensile strain capacity. In this study, the measured interface frictional bond strength from the single fiber pullout tests together with other fiber and matrix properties were used to calculate fiber-bridging constitutive law and to determine the PSH indices of the SHUHPC and CNF-SHUHPC mixes.

Results and Discussion

Example 5

CNF Coating on PE Fiber

Figure 4A:
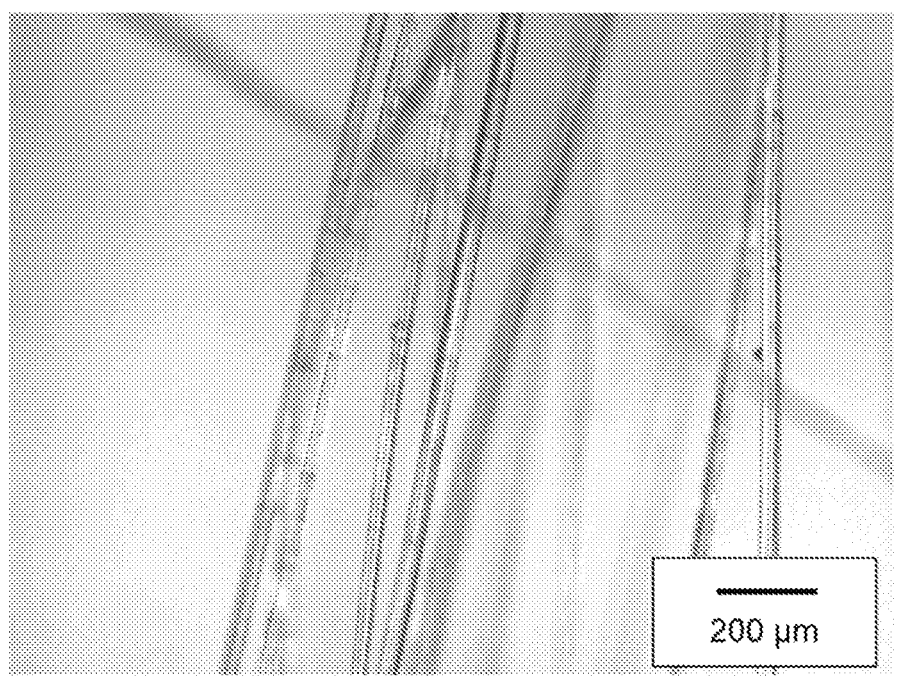
FIG. 4A is a micrograph of the pristine PE fiber at a 200 µm scale bar.
Figure 4B:
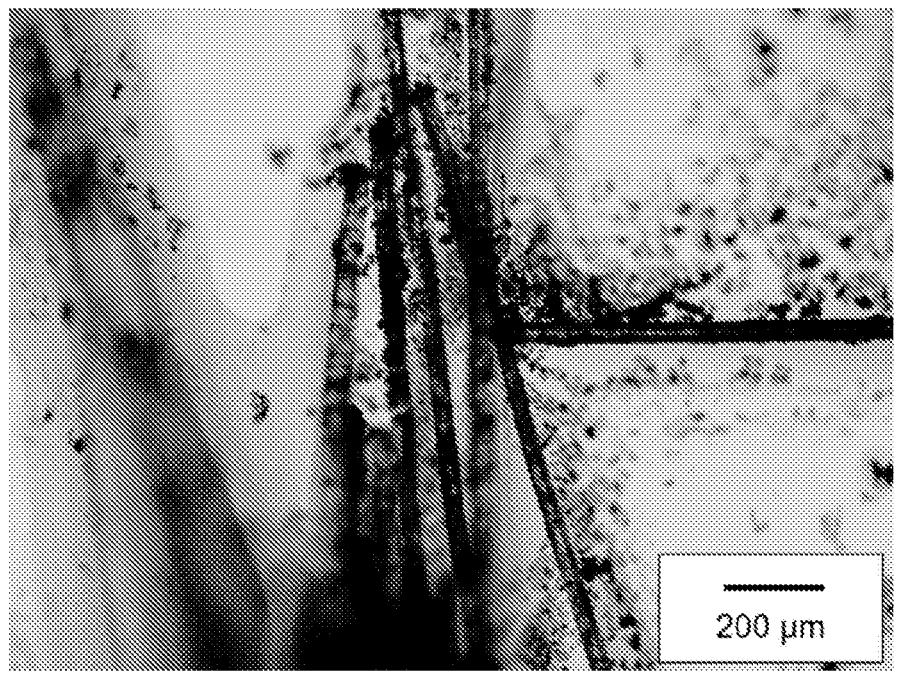
FIG. 4B is a micrograph of the CNF-coated PE fiber at a 200 µm scale bar.
Figure 4C:
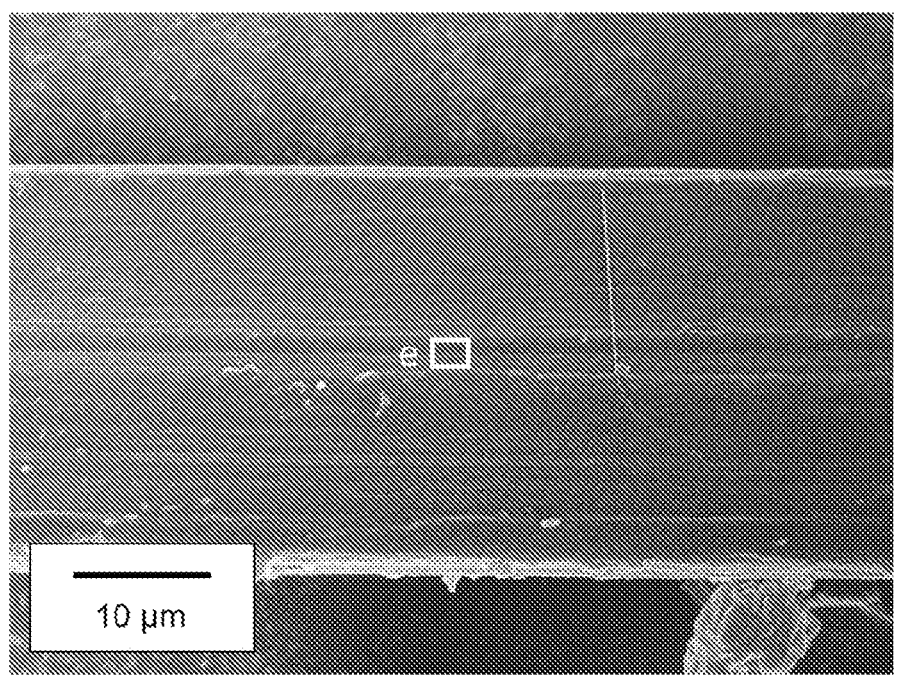
FIG. 4C is a micrograph of the pristine PE fiber at a 10 µm scale bar.
Figure 4D:
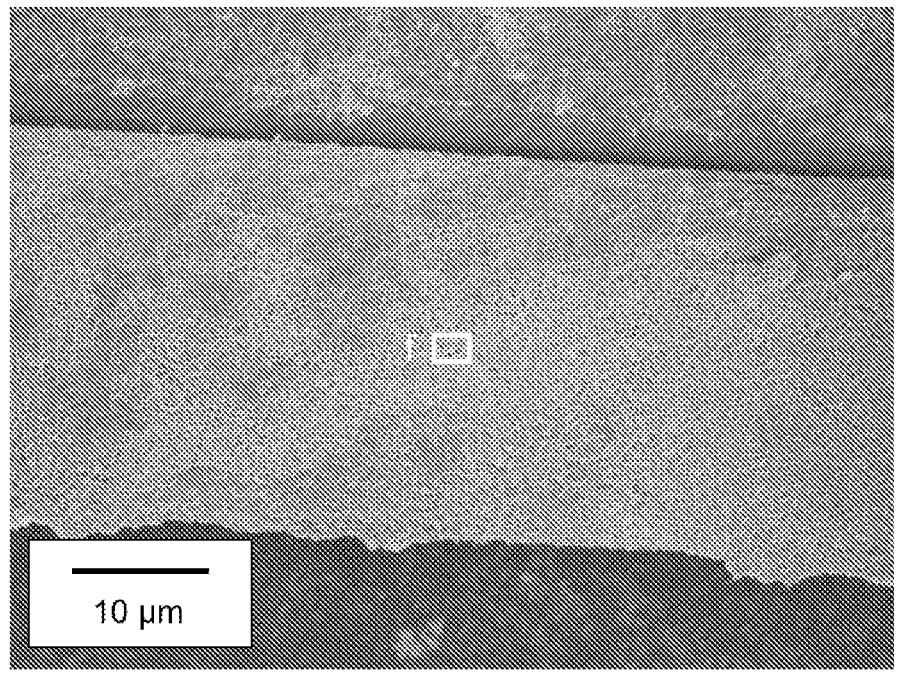
FIG. 4D is a micrograph of the CNF-coated PE fiber at a 10 µm scale bar.
Figure 4E:
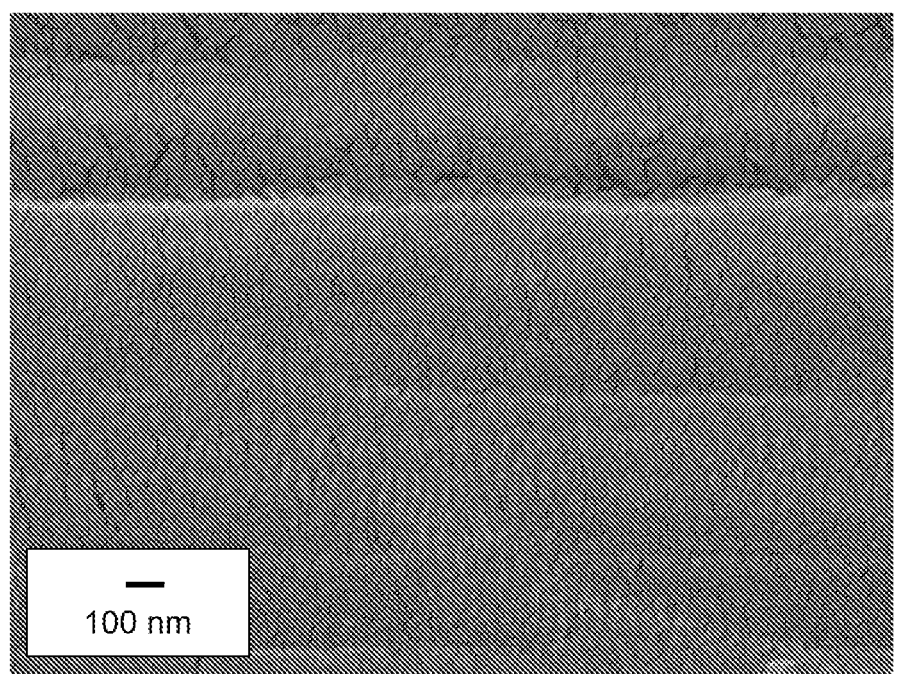
FIG. 4E is a micrograph of the pristine PE fiber at a 100 nm scale bar.
Figure 4F:
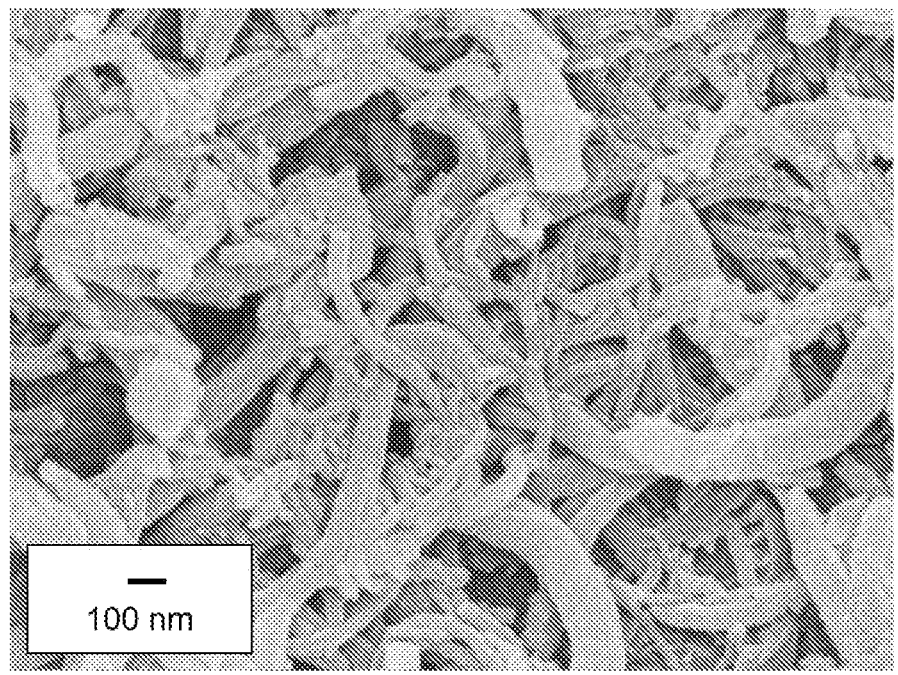
FIG. 4F is a micrograph of the CNF-coated PE fiber at a 100 nm scale bar.

FIG. 4A shows the optical microscopy image of pristine PE fibers which are white in nature with a high degree of transparency. As compared to the pristine fibers, PE fibers treated with CNFs are black as shown in FIG. 4B indicating CNFs are adhered to the surface of PE fibers. This was confirmed by comparing the SEM images of the pristine and the CNF-coated PE fibers (FIGS. 4C to 4F). As observed in the Figure, densely packed CNFs were found on the surface of treated PE fibers. A positive correlation has been observed between the transparency of the CNF film and its thickness. CNF films with a thickness of 50-250 nm and a corresponding transmittance of 90-50% were reported. The drastic change in visual transparency suggests the CNF layer on the PE fiber is dense with a thickness of at least 250 nm. Further study should be carried out to characterize the coating layer.

The thick CNF coating on PE fiber surface may be attributed to the long range of hydrophobic interaction. Perturbation caused by the presence of hydrophobes generally occurs only at the interface between hydrophobes and water. The three-dimensional hydrogen-bonding network of water; however, makes perturbations from the interface transmit over a long range. It has been reported that the range of attractive force from hydrophobic interaction are measured up to 3.5 μm which is several orders higher than the diameter of CNF. As a result, when PE fiber was immersed in the CNF suspension, a large volume of water surrounding the PE fibers would be perturbed causing dense and thick CNF coating on the surface of PE fibers.

Figure 5A:
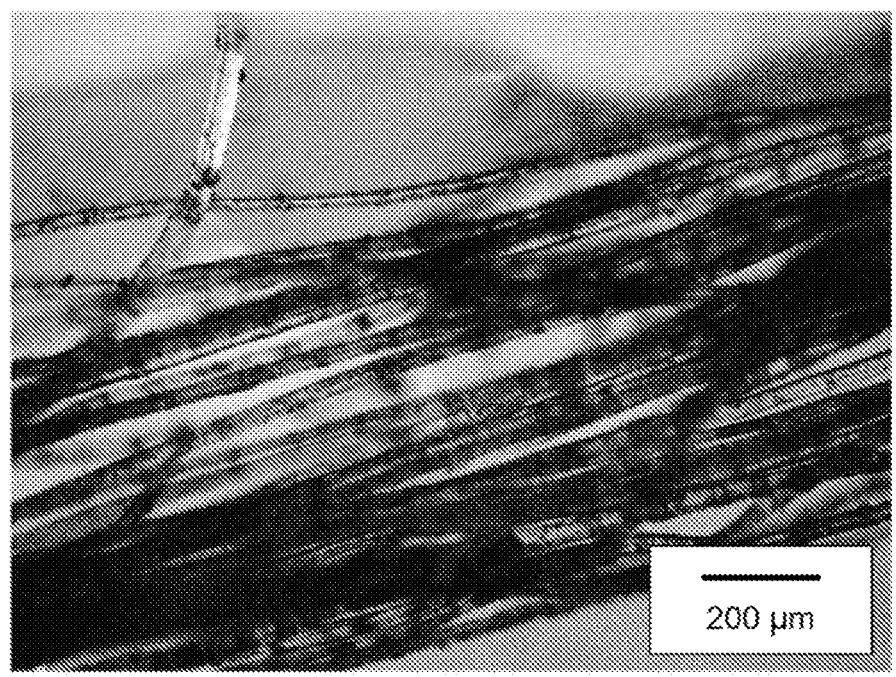
FIG. 5A is an optical microscope image of the CNF-coated PE fiber after mixing at a 200 µm scale bar.
Figure 5B:
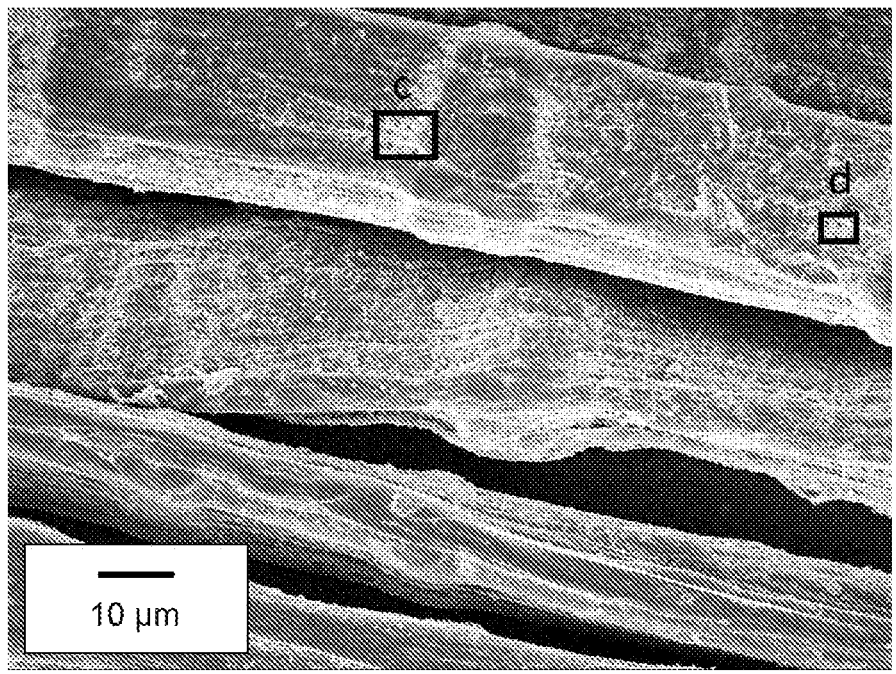
FIG. 5B is a scanning electron microscopy (SEM) micrograph of the CNF-coated PE fiber after mixing at a 10 µm scale bar.
Figure 5C:
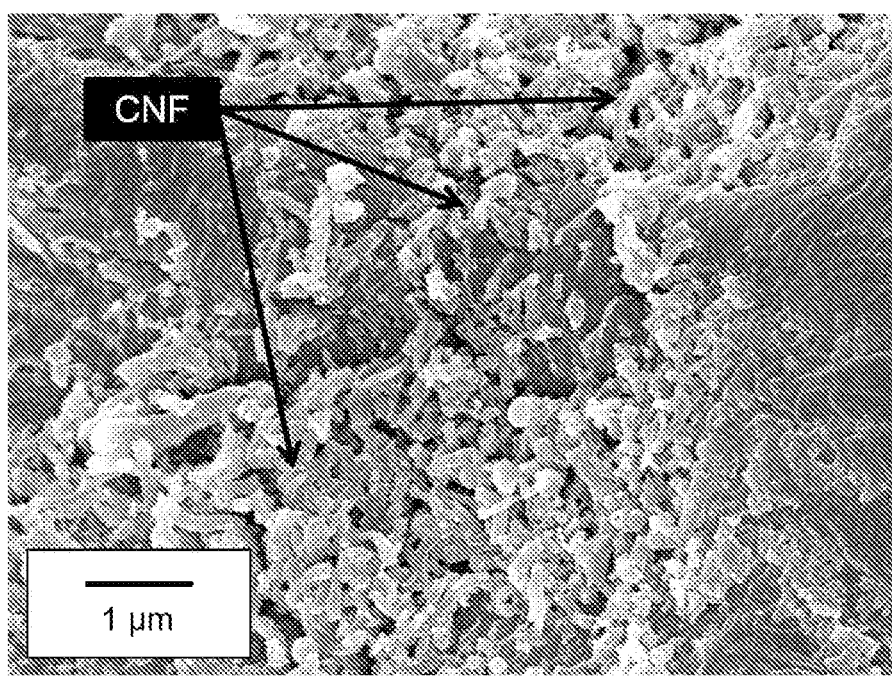
FIG. 5C is a SEM micrograph of the CNF-coated PE fiber after mixing at a 1 µm scale bar.
Figure 5D:
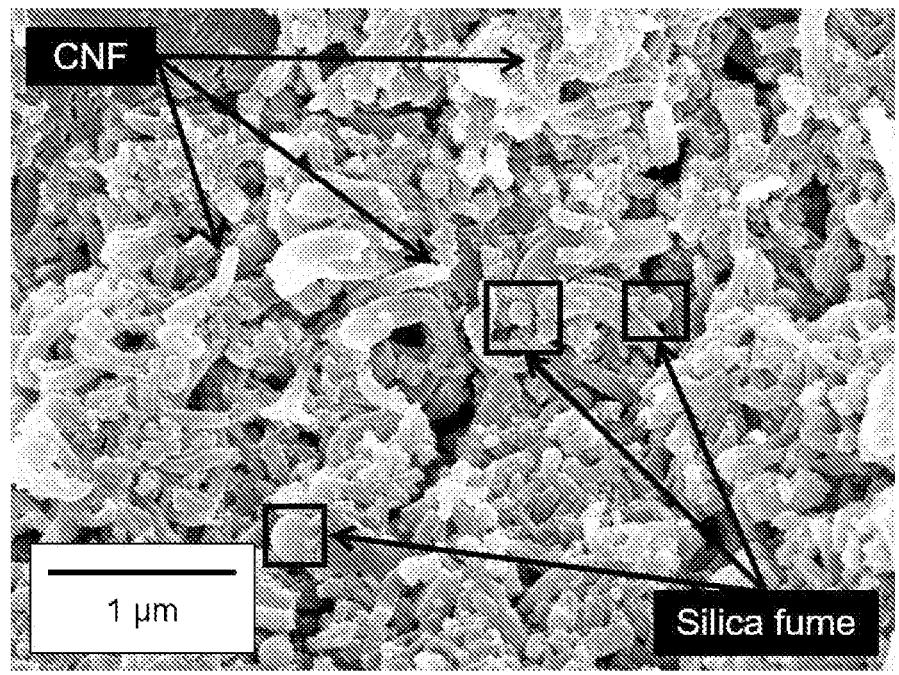
FIG. 5D is a SEM micrograph of the CNF-coated PE fiber after mixing at a 1 µm scale bar.

CNF-coated PE fibers were collected from the fresh CNF-SHUHPC paste after mixing. After collection, the CNF-coated fibers were washed by running water for few minutes to remove fresh cement paste and then stored in isopropanol to terminate cement hydration before microscopic imaging. As can be seen, the washed fibers remained black as shown in FIG. 5A suggesting CNFs stay on the surface of PE fibers even after mixing and washing. While the thickness of CNF layer may be reduced, a larger number of CNFs remains on the surface of PE fibers (FIG. 5B) and interlace with silica fume particles (FIGS. 5C and 5D).

Example 6

Mechanical Properties of CNF-SHUHPC

Table 4 summarizes the mechanical properties of CNF-SHUHPC incorporating CNF-coated PE fibers and the corresponding control mix SHUHPC where pristine PE fibers were used. As can be seen, CNF-SHUHPC has a compressive strength over 150 MPa. The use of CNF-coated fiber slightly increases the compressive strength which may be attributed to strengthening of ITZ between fiber and matrix with CNF as discussed in the next section.

Figure 7A:
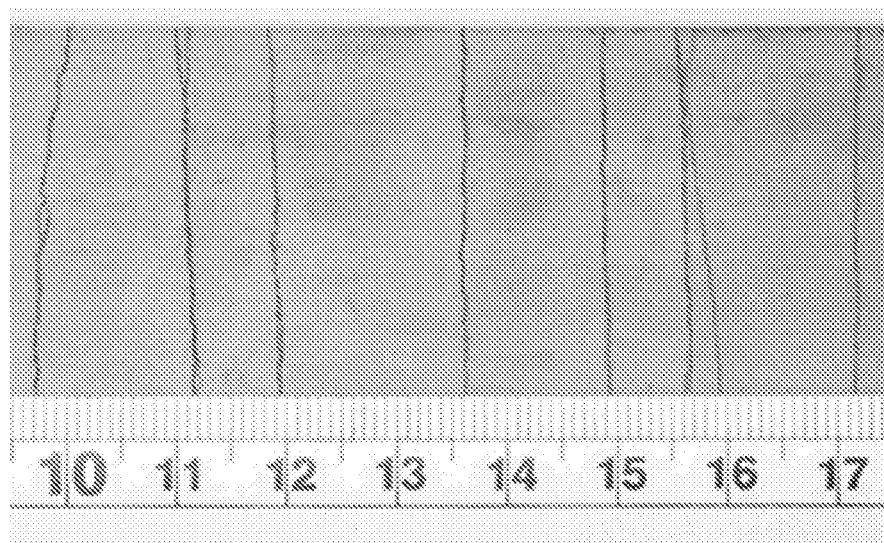
FIG. 7A shows the crack pattern of SHUHPC [unit in cm].
Figure 7B:
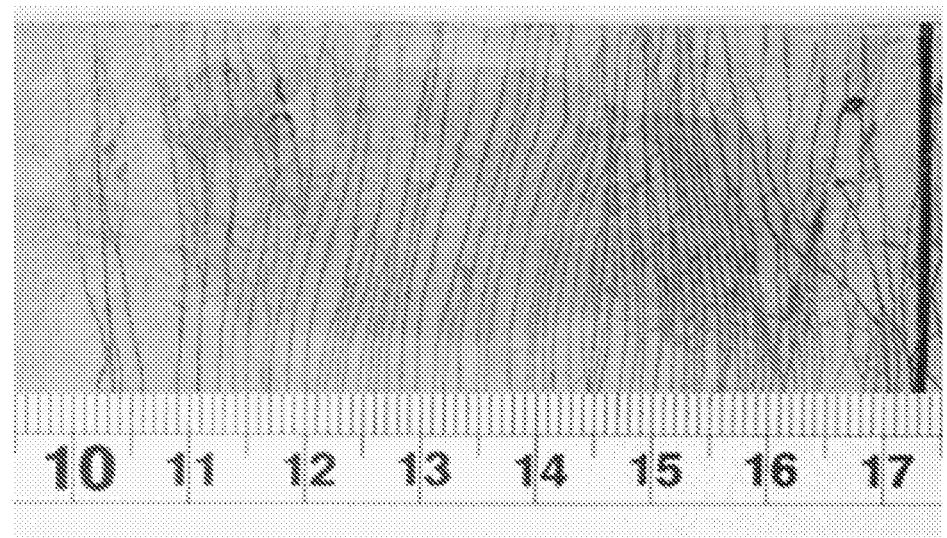
FIG. 7B shows the crack pattern of CNF-SHUHPC [unit in cm].

As summarized in Table 4, CNF-SHUHPC showed a 20% improvement in strain capacity from 1.9 to 2.3% and a 15% enhancement in tensile strength from 13 to 15 MPa as compared to the control SHUHPC. The enhanced tensile strength indicates a stronger fiber-bridging while the improved tensile strain capacity is a direct result of formation of more multiple cracks in the CNF-SHUHPC specimen as shown in FIGS. 7A and B. As can be seen, the crack pattern of SHUHPC was very different from that of CNF-SHUHPC. The crack spacing determined by the critical stress transfer distance ($x_d$) in CNF-SHUHPC was much reduced.

Figure 8A:
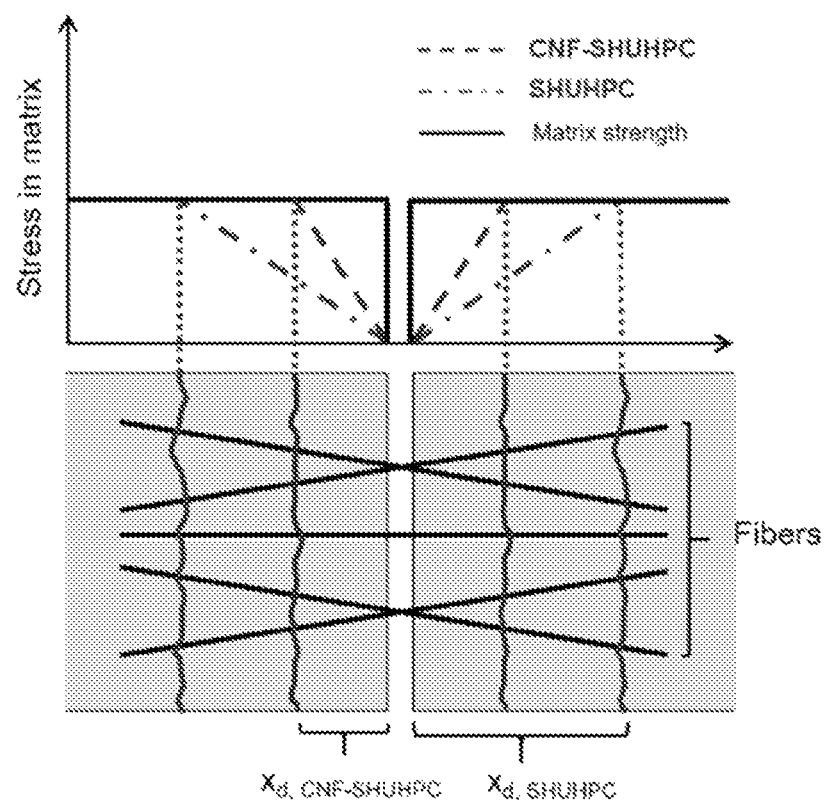
FIG. 8A is an illustration of critical transfer distances ($x_d$) in SHUHPC and CNF-SHUHPC.

The stress transfer distance was first derived by Aveston et al. for continuous aligned fibers and was later extended for randomly distributed short fibers. In the analysis, when crack forms, matrix along the crack plane becomes stress-free and the applied load is carried by the bridging fibers across the crack plane to maintain equilibrium. The stress carried by the fibers is then transferred back to the matrix through fiber/matrix interfacial friction. The matrix stress is gradually increased with distance away from the crack plane as illustrated in FIG. 8A. At a critical transfer distance, the matrix stress reached the matrix cracking strength resulting in the formation of another crack plane.

Figure 8B:
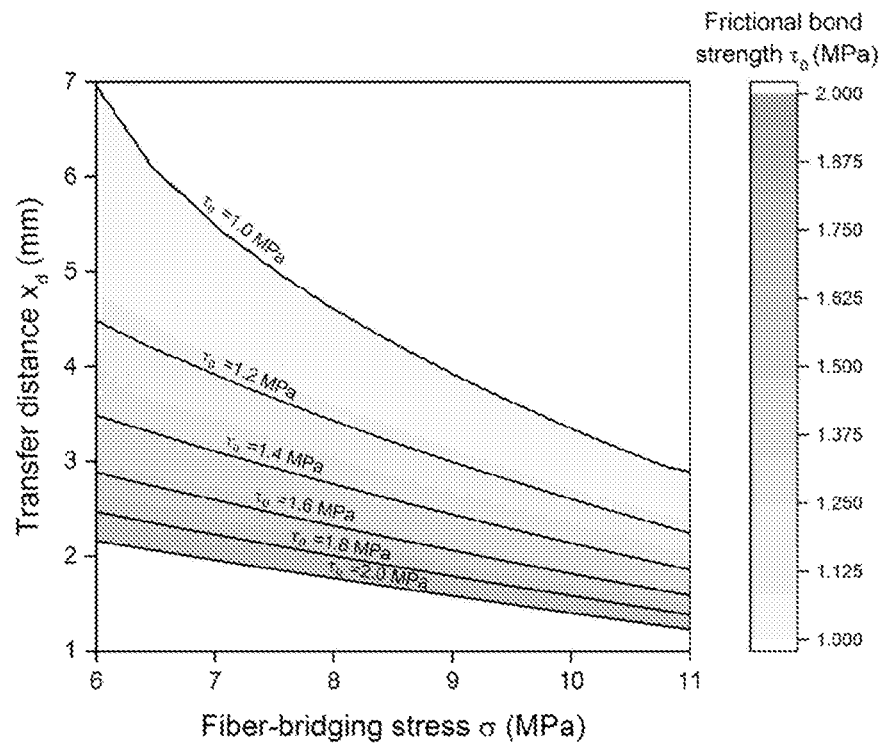
FIG. 8B shows the transfer distance $x_d$ as a function of fiber-bridging stress (sand interface frictional bond strength $\tau_0$.

A micromechanics-based analytical model was developed to calculate the transfer distance $x_d$ as a function of fiber-bridging stress a at different interface frictional bond strength of 1 to 2 MPa as FIG. 8B. Input parameters for the calculation included fiber diameter, fiber length, fiber Young's modulus, and fiber strength as shown in Table 2; fiber volume (1.5 vol. %) according to Table 1; and matrix strength of 8.2 MPa was experimentally determined. As can be seen, the required transfer distance reduced with increasing fiber-bridging stress. Furthermore, transfer distance reduces with increasing interface frictional bond strength at a given fiber-bridging stress level. Thus, the reduced crack spacing in CNF-SHUHPC suggested higher interface frictional bond strength and a more effective load transfer from the fiber back to the matrix through the interface due to the use of CNF-coated PE fibers.

Furthermore, crack width in CNF-SHUHPC was much reduced which again can be attributed to higher interface frictional bond strength which restrained the slippage of the

TABLE 4

Results of mechanical tests

| Mixture ID | Compressive strength (MPa) | 1$^{st}$ cracking strength (MPa) | Tensile strength (MPa) | Ultimate strain (%) | Crack Nos. | Crack width (μm) |
|---|---|---|---|---|---|---|
| SHUHPC | 144 ± 2 | 7.6 ± 1.0 | 13.1 ± 1.2 | 1.9 ± 0.3 | 16.3 | 142 ± 67 |
| CNF-SHUHPC | 153 ± 4 | 8.8 ± 0.7 | 15.0 ± 0.5 | 2.3 ± 0.3 | 38.3 | 71 ± 42 |

Figure 6A:
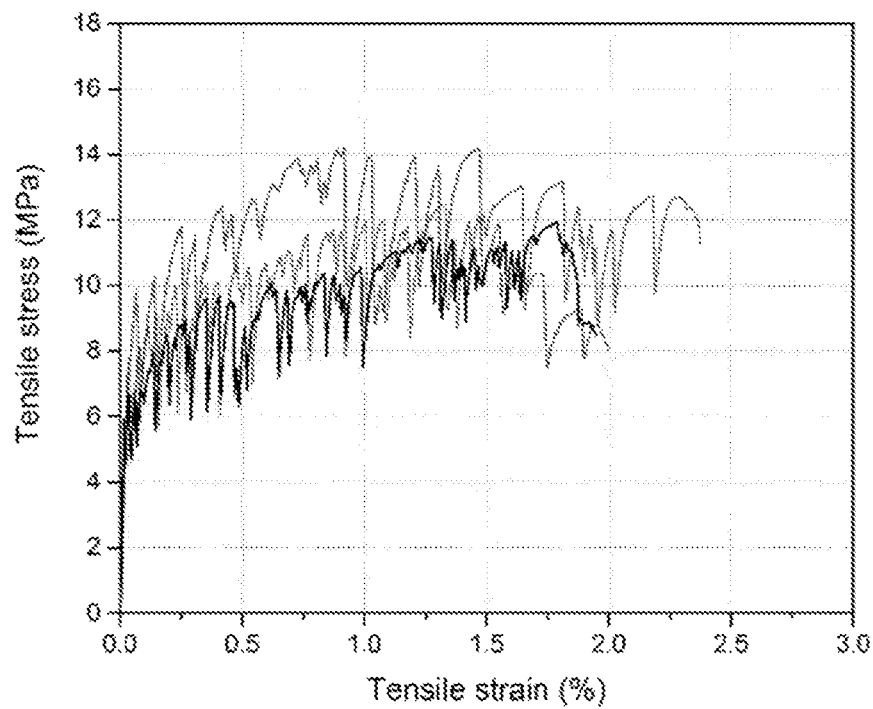
FIG. 6A is a graph showing tensile stress-strain curves of strain hardening ultra-high performance concrete (SHUHPC). In this graph, three stress-strain curves of the same material are shown, wherein each curve represents the result of an individual test. The tests are carried out to demonstrate that the performance of the materials is consistent since cement-based materials are generally very sensitive under tension.
Figure 6B:
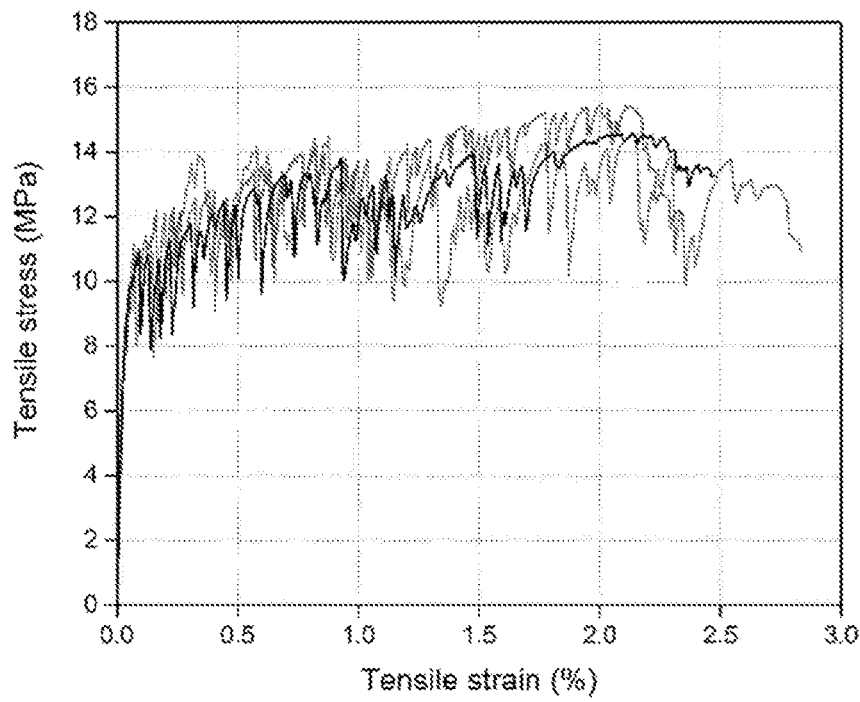
FIG. 6B is a graph showing tensile stress-strain curves of CNF-SHUHPC. As above in FIG. 6A, three stress-strain curves of the same material are shown, wherein each curve represents the result of an individual test.

FIGS. 6A and B show the tensile stress-strain curves of the two mixes. As can be seen, both mixes exhibit tensile strain hardening behavior. Three distinctive phases can be observed in the tensile behavior of the composites. A linear line with a slope equal to the elastic modulus of the material can be observed in the initial elastic stretching phase. After matrix first cracking, the load continues to increase without damage localization. The sequential formation of multiple parallel cracks contributes to the inelastic straining during the strain hardening stage. Fracture occurs once the fiber-bridging is exhausted which defines the ultimate strength of the material.

fiber. This is consistent with the previous work which reported that the increase of fiber/matrix interface frictional bond is responsible for the tight crack width in SHCC. Tight crack width in CNF-SHUHPC greatly reduced transport properties, increased the potential of autogenous crack healing, and enhances durability.

Example 7

Fiber/Matrix Interface Properties of CNF-SHUHPC

Figure 9:
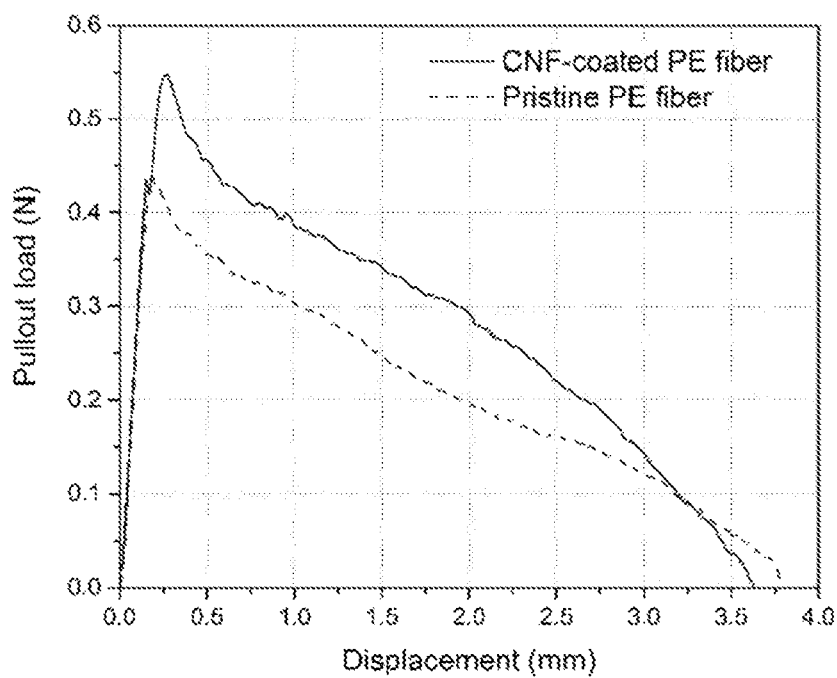
FIG. 9 shows typical single fiber pullout curves of the pristine PE fiber and the CNF-coated PE fiber from the SHUHPC matrix with the same embedment length ($L_e$=3.4 mm).

FIG. 9 presents the typical single fiber pullout curves of the pristine PE fiber and CNF-coated PE fiber from the SHUHPC matrix. The interface frictional bond strength was derived from the peak pullout force for a given fiber diameter and embedment length. The average interface frictional bond strength was 1.36±0.39 MPa for the pristine PE fiber and 1.66±0.40 MPa for the CNF-coated PE fiber. The CNF coating results in 22% enhancement of the interface frictional bond strength.

matrix fracture toughness $K_m$ was deduced based on the wedge splitting test. Matrix Young's modulus $E_m$ and snubbing coefficient f were assumed to be the same as another PE fiber-reinforced UHPC with similar matrix composition and compressive strength reported previously. The interface frictional bond strengths $\tau_0$ were derived from the single fiber pullout tests in the previous section.

TABLE 5

Micromechanical parameters for model calculation and results

| Mixture ID | Fiber | | | | Matrix | | | Interface | | | Model results | | |
|---|---|---|---|---|---|---|---|---|---|---|---|---|---|
| | $d_f$ (μm) | $L_f$ (mm) | $\sigma_{fu}$ (MPa) | $E_f$ (GPa) | $E_m$ (GPa) | $\sigma_m$(MPa) | $K_m$ (MPa-m$^{1/2}$) | f | $\tau_0$ (MPa) | $J'_b$ (J/m$^2$) | $\sigma_0$ (MPa) | PSH$_{energy}$ | PSH$_{strength}$ |
| SHUHPC | 23 | 19 | 3250 | 113 | 48.4 | 8.2 | 1.5 | 0.59 | 1.36 | 449 | 14.4 | 9.8 | 1.7 |
| CNF-SHUHPC | 23 | 19 | 3250 | 113 | 48.4 | 8.2 | 1.5 | 0.59 | 1.66 | 514 | 16.5 | 11.2 | 2.0 |

Figure 10A:
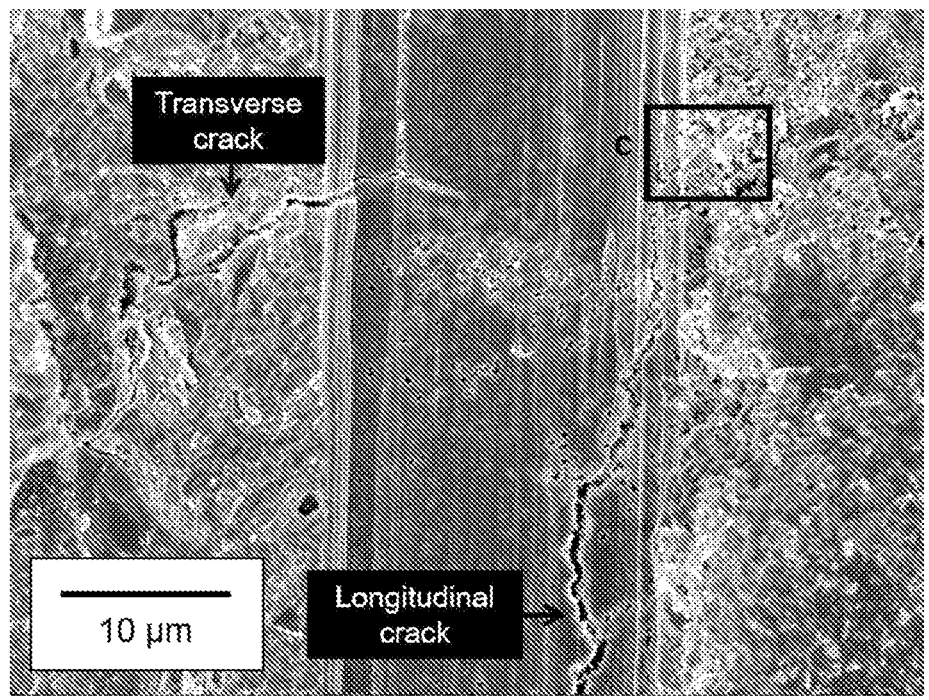
FIG. 10A is a SEM micrograph of fiber tunnel of the pristine PE fibers at a 10 μm scale bar.
Figure 10B:
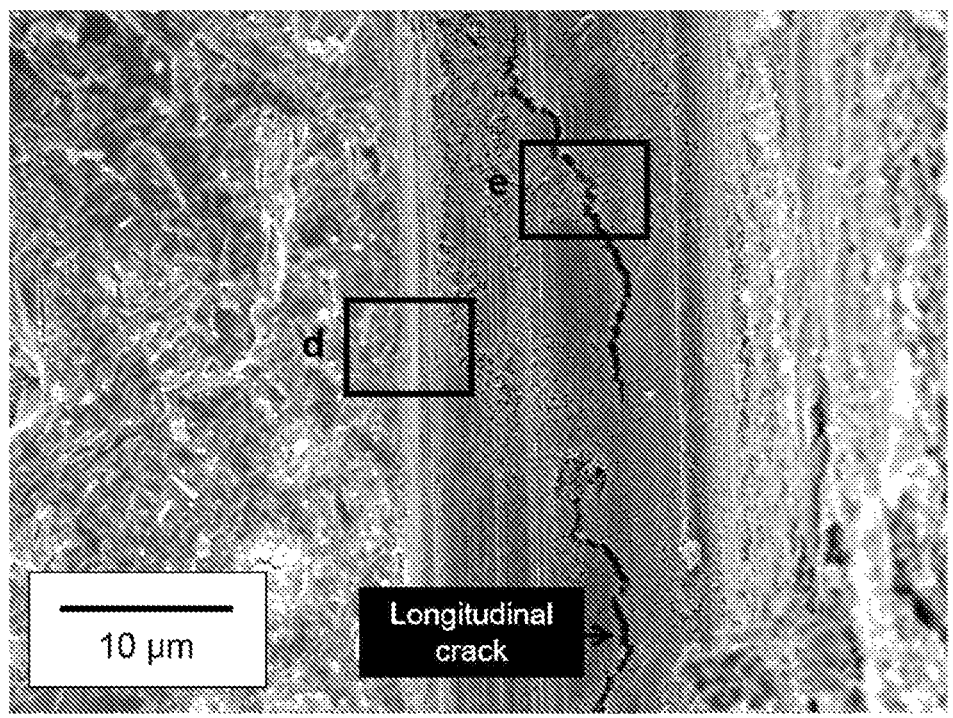
FIG. 10B is a SEM micrograph of fiber tunnel of the CNF-coated PE fibers at a 10 μm scale bar.
Figure 10C:
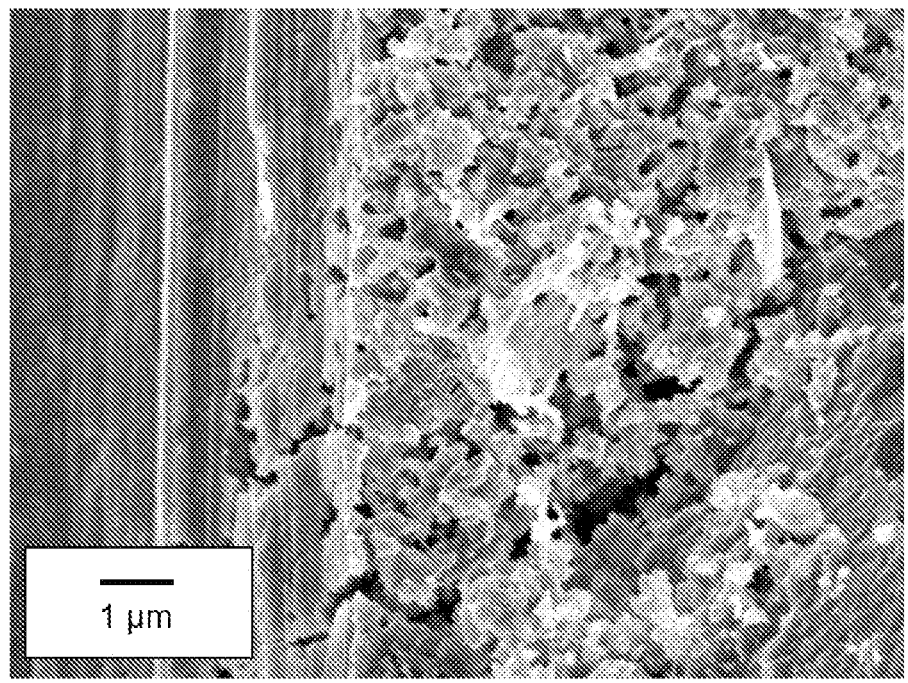
FIG. 10C is a SEM micrograph of fiber tunnel of the pristine PE fibers at a 1 μm scale bar.
Figure 10D:
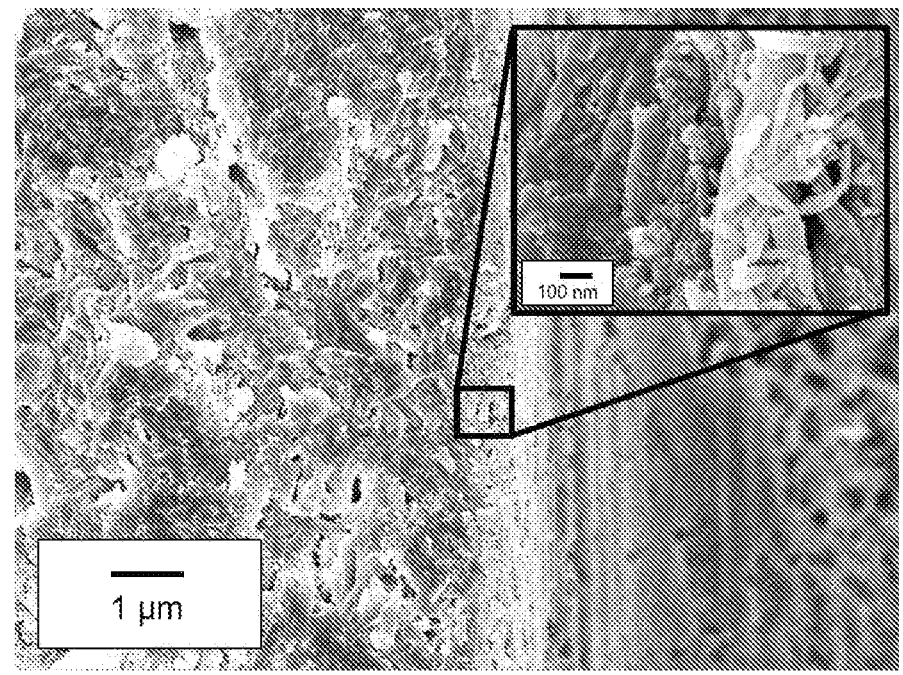
FIG. 10D is a SEM micrograph of fiber tunnel of the CNF-coated PE fibers at a 1 μm scale bar.
Figure 10E:
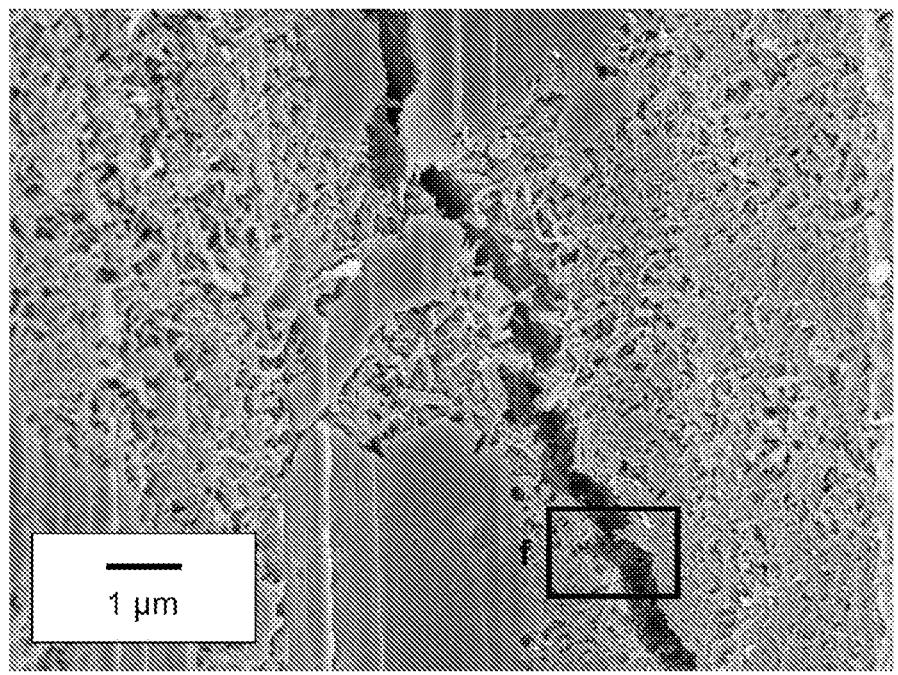
FIG. 10E is a SEM micrograph of fiber tunnel of the CNF-coated PE fibers at a 1 μm scale bar.
Figure 10F:
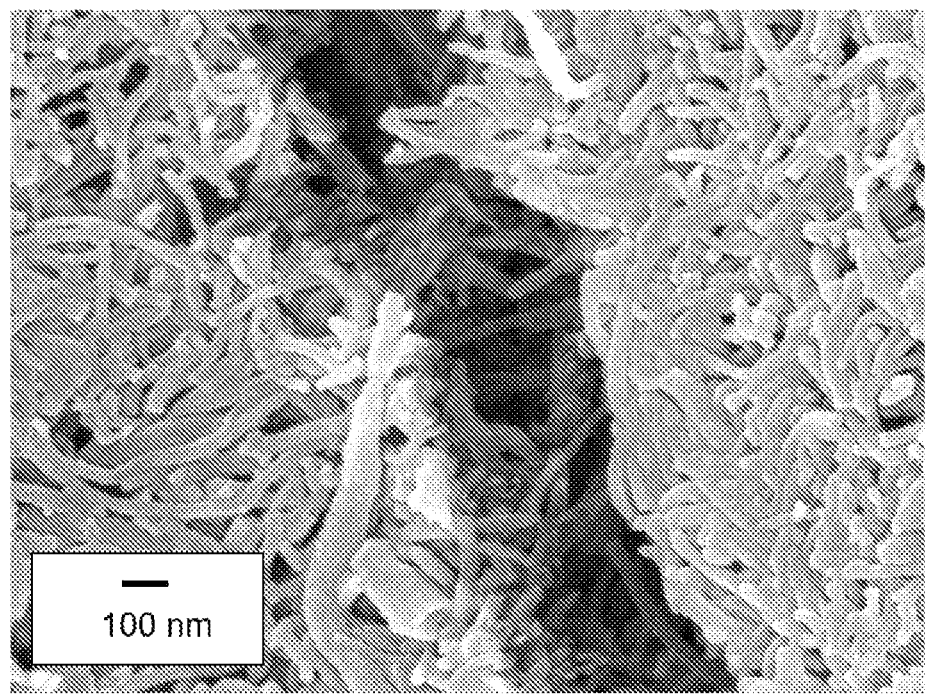
FIG. 10F is a SEM micrograph of fiber tunnel of the CNF-coated PE fibers at a 100 nm scale bar.

FIGS. 10A and 10B show the micrographs of fiber tunnel of the pristine PE fiber and the CNF-coated PE fiber. Longitudinal cracks along the tunnel, which were caused by matrix shrinkage, were found in both cases. However, transverse cracks, which result from fiber pullout during the test, were only observed in the pristine PE fiber single fiber pullout specimen. This suggested specimen incorporating the CNF-coated PE fiber has higher crack resistance against fiber pullout. As can be seen, the ITZ of the specimen with the CNF-coated PE fiber (FIG. 10D) was much denser than that of the specimen with the pristine PE fiber (FIG. 10C). This may be attributed to the filling of nano-pores in the ITZ with CNFs as shown in the inset of FIG. 10D. It is plausible some CNFs coated on the PE fibers may move away from the fibers to the surrounding matrix due to mixing and thus densify the surrounding ITZ as shown in the schematic illustration of FIG. 11. Furthermore, a mixture of cement paste and CNFs can be found in the fiber/matrix interface (FIG. 10E) and CNFs bridge nano-cracks in cement paste (FIG. 10F), which suggested hydration products penetrated into the CNF network so a weak transition zone is no longer present as illustrated in FIG. 11. These mechanisms resulted in the enhancement of interface frictional bond strength between PE fiber and UHPC matrix. The highly-concentrated CNFs layer on the PE fiber surface thus created a hierarchical structure near ITZ in CNF-SHUHPC, i.e. fiber, CNF network-reinforced C-S-H layer, CNF filled ITZ, and bulk matrix (FIG. 11). This highlighted strategic use of carbon nanomaterials in the critical region to enhance the performance of composites. As compared to previous studies where carbon nanomaterials are either added directly into the matrix or grown on the fiber surface through high temperature in-situ grafting, current approach is simple while effective, efficient, and economical.

Example 8

Micromechanics-Based Modeling of Strain Hardening Potential

Table 5 summarizes inputs for the calculation of complementary energy $J'_b$, peak fiber-bridging strength $\sigma_0$ and the two PSH indices based on the micromechanical model. The fiber parameters including fiber diameter $d_f$, fiber length $L_f$, fiber Young's modulus $E_f$, and apparent fiber strength $\sigma_{fu}$ were nominal values provided by the manufacturer. Matrix cracking strength $\sigma_m$ was experimentally determined and Model results are also reported in Table 5. As can be seen, CNF-SHUHPC possesses higher fiber bridging strength $\sigma_0$ (15% higher than SHUHPC), which is consistent with the experimental results that the tensile strength of CNF-SHUHPC is higher than that of control (FIGS. 6A and B). A higher peak fiber bridging strength $\sigma_0$ is favorable to the satisfaction of the strength criterion (Eqn. 3). The complementary energy $J'_b$ of CNF-SHUHPC increases from 449 to 514 J/m$^2$, which is in favor of the energy criterion (Eqn. 2). Both improvements can be attributed to the increased interface frictional bond strength $\sigma_0$ when CNF-coated PE fibers were included in the material. The PSH$_{energy}$ and the PSH$_{strength}$ indices increase by 14% and 18%, respectively. Material with higher values of PSH indices should have more chance of saturated multiple cracking and often leads to higher tensile ductility. As a result, CNF-SHUHPC possesses higher tensile strength as well as increased tensile ductility as shown in FIGS. 6A and B. In order to demonstrate the working principle of the present disclosure, an example of enhancing interfacial bond between a cement-based material matrix and polyethylene (PE) fiber by coating the surface of PE fiber with carbon nanofiber (CNF) is presented here. By integrating current disclosure, a strain hardening ultra-high performance concrete (SHUHPC) with superior mechanical properties was successfully developed.

Conclusions

This study highlighted strategic use of carbon nanomaterials in the critical region to enhance the performance of material. Specifically, an idea of using CNFs to strengthen the ITZ and enhance the interface frictional bond strength between PE fibers and cement-based matrix was proposed and realized by coating CNFs on the surface of PE fibers through hydrophobic interactions. As compared to previous studies where carbon nanomaterials are either added directly into the matrix or grown on the fiber surface through high temperature in-situ grafting, current approach is simple while effective, efficient, and economical. An SHUHPC incorporating such CNF-coated PE fibers was developed (CNF-SHUHPC). The resulting CNF-SHUHPC has a compressive strength over 150 MPa and exhibits 15% enhancement in tensile strength, 20% improvement in tensile strain capacity, and reduced cracking spacing as compared to the control SHUHPC, suggesting a more effective load transfer from the fiber back to the matrix through the interface due to the incorporation of CNF-coated PE fibers. Single fiber pullout tests confirmed the interface frictional bond strength of CNF-coated PE fiber was increased by 22%, which can be attributed to CNFs strengthening the ITZ by filling nanopores and bridging nano-cracks resulting in denser microstructure and higher crack resistance against fiber pullout as revealed by the micrographs. The highly-concentrated CNFs layer on the PE fiber surface created a hierarchical structure in cement-based materials. The increased interface frictional bond strength lead to higher fiber-bridging capacity, complementary energy, and PSH indices as calculated by the micromechanics model. These enhancements were in favor of multiple cracking and tensile strain hardening. As a result, SHUHPC incorporating CNF-coated PE fibers (CNF-SHUHPC) possessed higher tensile strength and increased tensile strain capacity as compared to the control SHUHPC where pristine PE fibers were used as reinforcement.

Commercial Applications of the Disclosure

The present disclosure relates to the process for enhancing the bond strength between reinforcement fibers and brittle matrix. It could be applied either to develop new high performance fiber reinforced composites with superior properties or to reduce the cost of any types of existing composites.

For example, current disclosure can be integrated to develop low-cost advanced concrete materials such as the strain hardening ultra-high performance concrete (SHUHPC) demonstrated in the example section. Conventional concrete has wide spread usage in construction although it is a commodity that does not perform well in the long-term or when subjected to man-made or natural hazards. Advanced fiber reinforced concretes show exceptional potential to repair existing structure and to build new sustainable infrastructure. The McKinsey Global Institute estimated in 2013 that the world will need to spend $57 trillion on infrastructure by 2030 to keep up global GDP growth.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A fiber-reinforced brittle matrix composite, comprising:
   a bulk matrix comprising a cementitious material, the bulk matrix forming a brittle matrix; and
   a plurality of coated fibers embedded in the bulk matrix, the plurality of coated fibers comprising a fiber and a carbon-based nanomaterial non-covalently adhered to the fiber.

2. The fiber-reinforced brittle matrix composite of claim 1, wherein the carbon-based nanomaterial is disposed on the fiber by a non-covalent attractive interaction.

3. The fiber-reinforced brittle matrix composite of claim 1, wherein the carbon-based nanomaterial is arranged in layers surrounding the fiber.

4. The fiber-reinforced brittle matrix composite of claim 1, wherein the plurality of coated fibers embedded in the bulk matrix are adhered to the bulk matrix by friction.

5. The fiber-reinforced brittle matrix composite of claim 1, wherein the bulk matrix further comprises a silica-containing material.

6. The fiber-reinforced brittle matrix composite of claim 1, wherein the bulk matrix further comprises a plasticizer.

7. The fiber-reinforced brittle matrix composite of claim 1, wherein the plurality of fibers comprise a material selected from the group consisting of a metallic fiber, an inorganic fiber, a polymeric fiber, and a carbon fiber.

8. The fiber-reinforced brittle matrix composite of claim 1, wherein a plurality of fibers are selected from the group consisting of steel fiber, polyethylene fiber, polypropylene fiber, polytetrafluoroethylene fiber, polyacrylate fiber, polyester fiber, carbon fiber, glass fiber, silicon carbide fiber, alumina fiber, and mullite fiber.

9. The fiber-reinforced brittle material composite of claim 1, wherein the carbon-based nanomaterial is selected from the group consisting of single-wall carbon nanotubes (SWCNTs), multi-wall carbon nanotubes (MWCNTs), carbon nanofibers (CNFs), fullerene, graphene, and a combination thereof.

10. The fiber-reinforced brittle matrix composite of claim 1, wherein the plurality of fibers are selected from the group consisting of glass fiber, silicon carbide fiber, alumina fiber, and mullite fiber.

11. The fiber-reinforced brittle matrix composite of claim 1, wherein the carbon-based nanomaterial comprises carbon nanotubes.

12. The fiber-reinforced brittle matrix composite of claim 1, wherein the coated fibers reinforce the bulk matrix by bridging nano-cracks, filling nano-pores and serving as seeds to promote hydration.

13. The fiber reinforced brittle matrix of claim 1, wherein a larger portion of the carbon-based nanomaterial adhered to the fiber is oriented in a longitudinal direction along the associated fiber than a radial direction.

14. A method for preparing a fiber-reinforced brittle matrix composite, the method comprising:
   providing a plurality of fibers;
   disposing a coating material on the plurality of fibers to form coated fibers, the coating material comprising a carbon-based nanomaterial, the coating material being non-covalently adhered to the fiber; and
   embedding the coated fibers in a bulk matrix that comprises a cementitious material to obtain the fiber-reinforced brittle matrix composite.

15. The method of claim 14, wherein disposing the carbon-based nanomaterial on the plurality of fibers is carried out by a method selected from the group consisting of dip coating, die coating, extrusion coating, and a combination thereof.

16. The method of claim 14, wherein disposing the carbon-based nanomaterial on the plurality of fibers comprises self-assembling the carbon-based nanomaterial on the plurality of fibers.

17. The method of claim 14, wherein disposing the carbon-based nanomaterial on the plurality of fibers comprises contacting the plurality of fibers with the carbon-based nanomaterial in a solvent which exhibits a repulsive interaction with the plurality of fibers and the carbon-based nanomaterial.

18. The method of claim 14, wherein embedding the coated fibers in the bulk matrix comprises adding the coated fibers in a gradual manner to the bulk matrix.

* * * * *